(12) United States Patent
Neeman

(10) Patent No.: US 8,756,593 B2
(45) Date of Patent: *Jun. 17, 2014

(54) MAP GENERATOR FOR REPRESENTING INTERRELATIONSHIPS BETWEEN APP FEATURES FORGED BY DYNAMIC POINTERS

(71) Applicant: Splunk Inc., San Francisco, CA (US)

(72) Inventor: Itay A. Neeman, Ramat Hasharon (IL)

(73) Assignee: Splunk Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/910,899

(22) Filed: Jun. 5, 2013

(65) Prior Publication Data

US 2013/0318514 A1 Nov. 28, 2013

(51) Int. Cl.
*G06F 9/44* (2006.01)

(52) U.S. Cl.
USPC .............................. 717/168; 717/120; 711/170

(58) Field of Classification Search
USPC .................. 717/168–174, 120; 709/203–204
IPC .................. G06F 9/44,7/12, 8/60, 8/70, 9/4428
See application file for complete search history.

(56) References Cited

U.S. PATENT DOCUMENTS

| | | | |
|---|---|---|---|
| 5,805,891 A * | 9/1998 | Bizuneh et al. ............... | 717/121 |
| 6,029,207 A | 2/2000 | Heninger | |
| 6,044,224 A | 3/2000 | Radia et al. | |
| 6,154,878 A | 11/2000 | Saboff | |
| 6,367,077 B1 * | 4/2002 | Brodersen et al. ............ | 717/170 |
| 6,606,744 B1 * | 8/2003 | Mikurak ........................ | 717/174 |
| 6,910,208 B1 * | 6/2005 | Zimniewicz ................... | 717/174 |
| 6,957,422 B2 | 10/2005 | Hunt | |
| 7,003,517 B1 * | 2/2006 | Seibel et al. ............................ | 1/1 |
| 7,155,701 B1 | 12/2006 | Gongwer et al. | |
| 7,275,079 B2 * | 9/2007 | Brodsky et al. ............... | 709/203 |
| 7,305,671 B2 * | 12/2007 | Davidov et al. ............... | 717/172 |
| 7,360,087 B2 * | 4/2008 | Jorgensen et al. ............. | 713/168 |
| 7,640,491 B2 | 12/2009 | Goodacre et al. | |
| 7,644,406 B2 * | 1/2010 | Gustafson et al. ............. | 717/172 |
| 7,653,900 B2 | 1/2010 | Kinderknecht et al. | |
| 7,725,889 B2 * | 5/2010 | Gustafson et al. ............ | 717/168 |
| 7,747,997 B1 * | 6/2010 | Rao ................................ | 717/170 |
| 7,805,719 B2 * | 9/2010 | O'Neill ......................... | 717/168 |

(Continued)

OTHER PUBLICATIONS

Ducournau, "Implementing Statically Typed Object-Oriented Programming Languages", ACM Computing Surveys, vol. 43, No. 3, Article 18, pp. 1-48, 2011.*

(Continued)

*Primary Examiner* — Anil Khatri
(74) *Attorney, Agent, or Firm* — Hickman Palermo Truong Becker Bingham Wong LLP

(57) ABSTRACT

A first feature (e.g., chart or table) includes a reference to a dynamic pointer. Independently, the pointer is defined to point to a second feature (e.g., a query). The first feature is automatically updated to reflect a current value of the second feature. The reference to the pointer and pointer definition are recorded in a central registry, and changes to the pointer or second feature automatically cause the first feature to be updated to reflect the change. A mapping between features can be generated using the registry and can identify interrelationships to a developer. Further, changes in the registry can be tracked, such that a developer can view changes pertaining to a particular time period and/or feature of interest (e.g., corresponding to an operation problem).

21 Claims, 18 Drawing Sheets

(56) References Cited

U.S. PATENT DOCUMENTS

| | | | |
|---|---|---|---|
| 7,818,736 B2 * | 10/2010 | Appavoo et al. | 717/168 |
| 8,006,240 B2 * | 8/2011 | Bhatkhande et al. | 717/169 |
| 8,245,216 B2 * | 8/2012 | Felts | 717/169 |
| 8,365,164 B1 | 1/2013 | Morgenstern | |
| 8,407,682 B2 * | 3/2013 | Reisman | 717/168 |
| 8,499,030 B1 * | 7/2013 | Reisman | 709/203 |
| 8,595,715 B2 * | 11/2013 | Ward et al. | 717/170 |
| 8,645,939 B2 * | 2/2014 | Felts | 717/169 |
| 2009/0144726 A1 | 6/2009 | Felts | |
| 2011/0191763 A1 | 8/2011 | Balassanian | |

OTHER PUBLICATIONS

Marlow et al, "Faster Laziness Using Dynamic Pointer Tagging", ACM, pp. 277-288, 2007.*

Hummel et al, "A General Data Dependence Test for Dynamic, Pointer-Based Data Structures", ACM, pp. 218-229, 1994.*

Elkarablieh et al, "Precise Pointer Reasoning for Dynamic Test Generation", ACM, pp. 129-139, 2009.*

Non-Final Office Action of Dec. 5, 2013 for U.S. Appl. No. 13/910,811, 22 pages.

Notice of Allowance of Sep. 24, 2013 for U.S. Appl. No. 13/910,858, 9 pages.

* cited by examiner

Bindings:

Pointer
definitions:

MAP GENERATOR FOR REPRESENTING INTERRELATIONSHIPS BETWEEN APP FEATURES FORGED BY DYNAMIC POINTERS

TECHNICAL FIELD

The present disclosure relates generally to computer-implemented systems and methods for managing dynamic pointers and facilitating automatic updating of electronic features using dynamic pointers.

BACKGROUND

Electronic developers use programming languages and/or user interfaces to develop webpages, app software or other interfaces. In one instance, the developed electronic media can be dynamic and selectively present interaction options or content that depend on factors such as past user selections or recent events. In another instance, the developed media's interaction objects or content can be subject to repeated developer updates.

In either instance, the developer is faced with a problem of how to address uncertainty in the face of designing other portions of the media. The developer may choose to attempt to reduce or eliminate dependencies on the uncertain aspect, or he may be faced with repeatedly updating dependent aspects based on a current dynamic or selected value. The former approach limits the media's functional and presentation capabilities. The latter approach requires substantial time investment and is error-prone.

SUMMARY

In accordance with the teachings provided herein, systems and methods for using a central registry to facilitate app development and to manage and use dynamic pointers are provided. A developer creates a first feature (e.g., chart or table) that references a dynamic pointer. The pointer is defined as pointing to a second feature (e.g., a query that returns "a value" which can be responsive to or identifying user input). The reference can be created before defining the pointer or the converse. The reference and pointer definition are recorded in a central registry. The first feature is then bound to the pointer and second feature and registered to receive notifications of changes to the pointer and/or second feature. The first feature is dynamically updated based on a current value of the second feature. For example, a cell in a table can reflect a selected value of a query, or options in a first query can be determined based on a selected value for a second query. Thus, the developer need not repeatedly revise the first feature to accommodate each second-feature value.

In one feature, the pointer definition may subsequently change (e.g., to point to a third feature). The first feature will be notified of the change and its registrations will be adjusted appropriately. The first feature will automatically reflect the change. If multiple features reference the pointer, all features are automatically updated without requiring the developer to suffer through an error-prone approach of modifying each feature. In another feature, the developer may subsequently revise the first feature to reference another pointer. Registrations will again be appropriately adjusted.

At any given time, the central registry can be used to understand the relationships between features and pointers. For example, the registry can be used to identify, for a given feature, all other features bound to it. Intermediate binding pointers and binding directionality can further be identified. This information can be presented to a developer via text and/or graphics to facilitate environment understanding and debugging.

Binding changes (e.g., definitions of pointers or references to pointers) are tracked. All or part of the binding history can then be presented to the developer. For example, the history can presented using a visual timeline with markers representing binding changes and text associated with the markers providing details about the change. The developer can filter the history to focus on a particular time period or particular features. Thus, e.g., if the developer is aware of a problem that began during a time period and/or involving an feature, events so associated can suggest changes that led to the problem.

In some embodiments, a computer-implemented method is provided. The method includes accessing a central registry. The central registry includes a set of app feature names corresponding to a set of app features, each app feature of the set of app features being presentable in an app. The central registry also includes a set of dynamic pointer names corresponding to a set of dynamic pointers, at least one dynamic pointer of the set of dynamic pointers having a value set to an app feature name. The central registry further includes a set of bindings, each binding of the set of bindings binding a first app feature name from the set of first app feature names to a dynamic pointer of the set of dynamic pointers. The method also includes determining a set of indirect bindings. Each indirect binding of the set of indirect bindings is between a first app feature name of a first app feature and a second app feature name of a second app feature. The first app feature name is bound to a dynamic pointer. The dynamic pointer has a value set to the second app feature. Each of the first app feature and the second app feature is of the set of app features. The method further includes determining a map identifying interrelationships between app features of the set of app features, generating a presentation of the map, the presentation including the set of app feature names and presenting the presentation.

In some embodiments, a system is provided that includes one or more data processors and a non-transitory computer readable storage medium containing instructions which when executed on the one or more data processors, cause the one or more processors to perform operations including accessing a central registry. The central registry includes a set of app feature names corresponding to a set of app features, each app feature of the set of app features being presentable in an app. The central registry also includes a set of dynamic pointer names corresponding to a set of dynamic pointers, at least one dynamic pointer of the set of dynamic pointers having a value set to an app feature name. The central registry further includes a set of bindings, each binding of the set of bindings binding a first app feature name from the set of first app feature names to a dynamic pointer of the set of dynamic pointers. The operations also include determining a set of indirect bindings. Each indirect binding of the set of indirect bindings is between a first app feature name of a first app feature and a second app feature name of a second app feature. The first app feature name is bound to a dynamic pointer. The dynamic pointer has a value set to the second app feature. Each of the first app feature and the second app feature is of the set of app features. The operations further include determining a map identifying interrelationships between app features of the set of app features, generating a presentation of the map, the presentation including the set of app feature names and presenting the presentation.

In some embodiments, a computer-program product is provided that is tangibly embodied in a non-transitory machine-readable storage medium, including instructions configured to cause one or more data processors to access a central registry. The central registry includes a set of app feature names corresponding to a set of app features, each app feature of the set of app features being presentable in an app. The central registry also includes a set of dynamic pointer names corresponding to a set of dynamic pointers, at least one dynamic pointer of the set of dynamic pointers having a value set to an app feature name. The central registry further includes a set of bindings, each binding of the set of bindings binding a first app feature name from the set of first app feature names to a dynamic pointer of the set of dynamic pointers. The instructions are further configured to cause the one or more data processors to determine a set of indirect bindings. Each indirect binding of the set of indirect bindings is between a first app feature name of a first app feature and a second app feature name of a second app feature. The first app feature name is bound to a dynamic pointer. The dynamic pointer has a value set to the second app feature. Each of the first app feature and the second app feature is of the set of app features. The instructions are also configured to cause the one or more data processors to determine a map identifying interrelationships between app features of the set of app features, to generate a presentation of the map, the presentation including the set of app feature names, and to present the presentation.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

The present disclosure is described in conjunction with the appended figures.

Like reference numbers and designations in the various drawings indicate like elements.

DETAILED DESCRIPTION

The ensuing description provides preferred exemplary embodiment(s) only and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes can be made in the function and arrangement of elements without departing from the spirit and scope as set forth in the appended claims.

Figure 1:
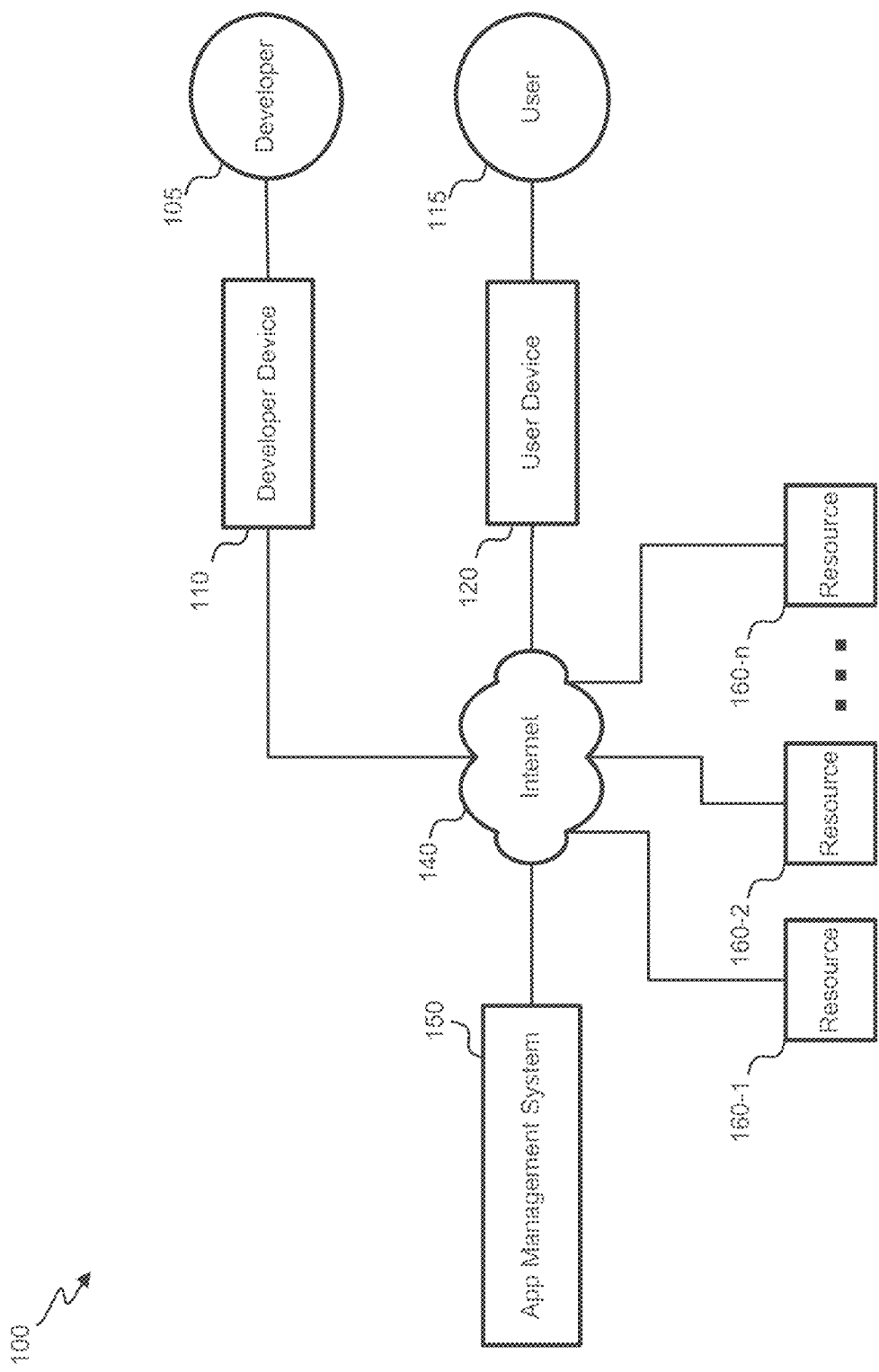
FIG. 1 shows a block diagram of an embodiment of an app-provision interaction system.

Referring first to FIG. 1, a block diagram of an embodiment of an app-provision interaction system 100 is shown. A developer 105 and/or user can interact with an app management system 150 via respective devices 110 and/or 120 and a network 140, such as the Internet, a wide area network (WAN), local area network (LAN) or other backbone. In some embodiments, app management system 150 is made available to one or more of developer 105 and/or user 115 via an app (that can be downloaded to and executed on a portable electronic device) or a website. It will be understood that, although only one developer 105 and user 115 are shown, system 100 can include multiple developers 105 and/or users 115.

Developer device 110 and/or user device 120 can each be a single electronic device, such as a hand-held electronic device (e.g., a smartphone). It will be understood that developer device 110 and/or user device 120 can also include a system that includes multiple devices and/or components. The device(s) 110 and/or 120 can comprise a computer, such as the desktop computer, a laptop computer or a tablet. In some instances, a party 105 and/or 115 uses different devices at different times to interact with app management system 150.

App management system 150 provides developer 105 with tools to facilitate development of an app. Developer 105 interacts with app management system 150 to define an operation and presentation of an app. As will be described in greater detail below, developer 105 can enter input that causes various app features to be defined.

App features include elements of an app that receive and/or present input to users 115. An app feature can be identified by its name and its value(s). The name can be textual or numeric and is used to distinguish the particular app features from other app features. To illustrate, names can include examples such as: Query1, Chart3, SatisfactionAssessment, or Client1PerformanceChart. Most frequently, the name is substantially or completely fixed, such that it does not vary merely based on user input or developer modification to the app feature. An app feature's value(s) indicate the feature's content and/or operation capabilities. For example, developer 105 can enter text that is to be presented or presentable (e.g., and is presented subsequent to receiving user input) as part of the feature. In one instance, developer 105 defines a set of first values for the app feature which can be iteratively or simultaneously presented to a user 115, and user 115 can select amongst the first values (e.g., using a pull-down menu or radio buttons) to define a second value. As another example, a value is automatically calculated based on underlying data. For example, app management system 150 can continuously identify virtual-machine performance characteristics (e.g., a bandwidth, memory usage, response time, etc.). Each of a set of app features can further process and/or have a value set to a real-time characteristic.

Figure 2:
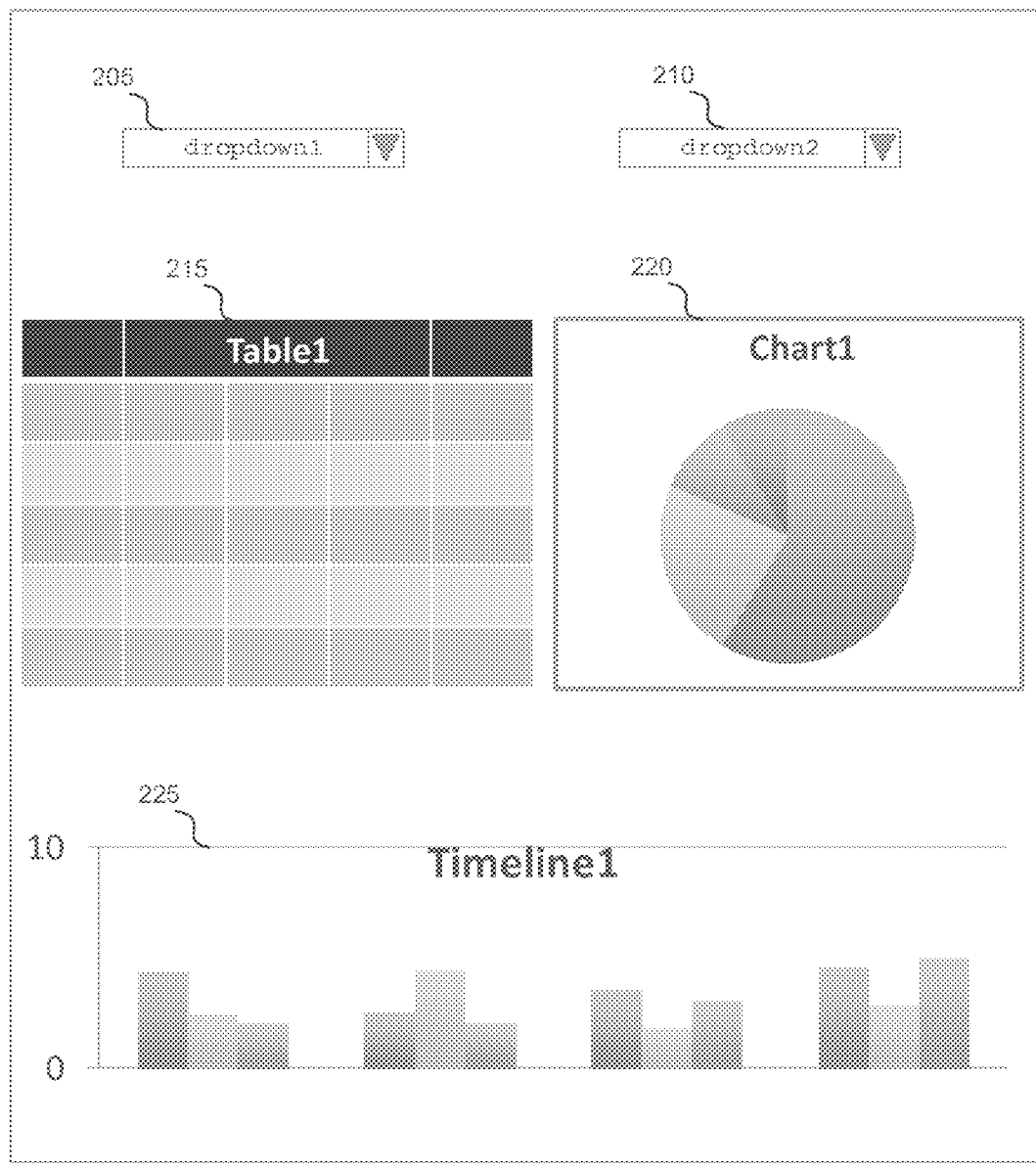
FIG. 2 illustrates example representations of a variety of app features.

FIG. 2 illustrates example representations of a variety of app features. App features 205 and 210 are query features, where a value can be defined (e.g., via selection by a user 115). In this instance, query features 205 and 210 include drop-down menus presenting a list of initial values from which the user can select a value. In other instances, a query feature can include a list of radio buttons, an open text box, a format-restricted text box (e.g., only accepting numbers), etc. In various embodiments, a query value can be set or selected by a user 115 using an app or by a developer 105 defining the app. In one instance, the initial values shown in query feature 210 depend on a selected value from query feature 205.

App features 215 and 220 are table and chart queries, respectively. Table feature 215 includes 25 cells, each of which can have a value therein. Chart feature 220 includes a pie graph, with four portions contributing to the whole. The values and/or portions can be again defined by a user and/or developer, or they can reflect values from another app feature (e.g., a cell value in table feature 215 can be set to a value selected in a query feature, or values contributing to a chart in chart feature 220 can be defined based on cell values in a table feature 215). App feature 225 is a timeline feature, that shows historical values. For example, one set of bars may reflect, for various timepoints, which value was selected using a query feature or a performance characteristic.

Ultimately, using input from developer 105 and capabilities of app management system 150, an app code is generated or updated and stored. This code can reference and/or define app features to be used in the app's operation. App management system 150 then executes the code such that the corresponding app can be presented to and used by users 115. During the app's execution, app management system 150 calls on and utilizes one or more resources 160 which can be remote from or co-located with app management system 150.

It will be appreciated that, while FIG. 1 shows app management system 150 as being separate from resources 160, in some embodiments, parts of system 150 are present on one or more resources 160. For example, databases or data summarizers can be present on resources 160.

Figure 3:
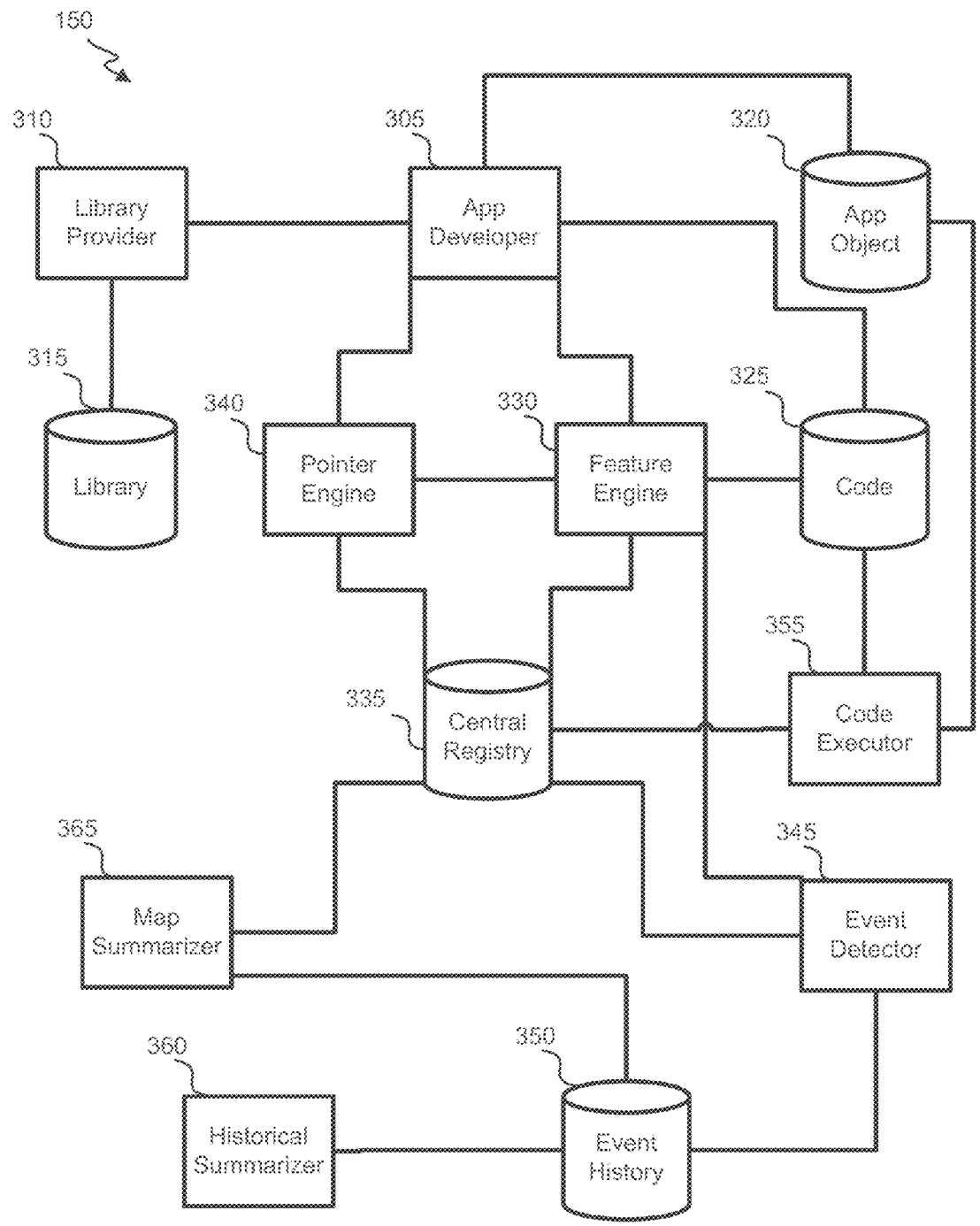
FIG. 3 shows a block diagram of an embodiment of app management system.

Referring next to FIG. 3, a block diagram of an embodiment of app management system 150 is shown. App management system 150 can be, in part or in its entirety, in a cloud. In some instances, at least part of app management system 150 is present on a device, such as a developer device 110. In some instances, various components in app management system 150 are present in a set of resource. For example, library database 315 can be stored on resource 160-1, code database 325 can be stored on resource 160-2, and central registry 335 can be stored on resource 160-n. Thus, app management system 150 can include a distributed system.

App management system 150 includes an app developer 305 that interacts with a developer 105 to facilitate development of an app. Initially, app developer 305 requests one or more libraries from library provider 310. Library provider 310 can use default a library selection (e.g., always providing a same library) or can base the selection based on characteristics of developer 105 and/or indications as to what type of app developer 105 wishes to develop. For example, developer's input and/or account data can identify a subscription type or level, a programming-skill level, an industry, a foreseen user-involvement level, and/or an authorization. Based on this data, one or more libraries can be appropriately selected. In one instance, library provider 310 and app developer 305 can coordinate to present a list of available libraries (potentially with associated costs) to developer 105, and he can then select which libraries will be provided.

Library provider 310 can then collect the appropriate library (or libraries) from library database 315. The library can include routines, subroutines, classes, modules and/or functions which can be stored in object format. It will be appreciated that disclosures that refer to "subroutines" herein can be extended to embodiments instead pertaining to routines, classes, modules, functions, etc. A library can include subroutines that pertain to app features and/or dynamic pointers. For example, a routine can register an app feature (e.g., by registering its name), determine whether an app feature exists, define an app feature or revoke an app feature.

The library can be made accessible to a developer 105 (via app developer 305). In one instance, a link can be provided, where selection of the link causes the library to be downloaded to a developer device 110. In one instance, the library is downloaded to a resource 160. Further, library provider 310 can provide instructions and/or examples to illustrate how aspects of the library (e.g., specific subroutines) can be used. In one instance, providing a library includes presenting names of available subroutines.

Developer 105 can upload or otherwise define app objects (e.g., graphics, videos, animations, etc.), which app developer 305 can store in an app-object database 320. Further, app developer 305 can facilitate the generation of a code (e.g., based on input from developer 105) that defines an app. The code can be stored in a code database 325. In one instance, a developer 105 uploads or enters code that loads a library and calls one or more subroutines from the library.

Developer 105 can interact with app developer 305 and utilize library subroutines to register and/or create an app feature. Initially, developer 105 can define a name of the app feature (e.g., while calling a feature-generation or feature-registration subroutine). A feature engine 330 can detect the instantiation (e.g., by detecting the call to the appropriate subroutine) and register the new app feature in a central registry 335. This registration can include identifying, e.g., the app feature's name, an app or code calling the registration subroutine, the developer responsible for the registration, an indication as to whether the app feature is empty or includes data (e.g., the feature being empty until it is otherwise defined), and/or an indication as to whether the app feature calls or references any dynamic pointers. It will be appreciated that while names (of features and/or of dynamic pointers) will typically include alphanumeric text, other identifiers can be used (e.g., numbers). Registration can include adding the identifying information to a list, column, row or matrix in central registry 335. The registration can further include assigning a unique identifier (e.g., a number, alphanumeric code or index) to the app feature.

Feature engine 330 can further detect feature-defining actions. For example, feature engine can detect use of a feature-defining subroutine or other triggering input. Creation of certain object types (e.g., using traditional coding language or subroutine calls) can cause the created object to be automatically registered. For example, creation of a menu, list, matrix, query, table and/or chart can automatically cause the object to be registered. In these instances, feature engine 330 can simultaneously detect the feature instantiation and that the feature is defined. Upon detecting that a feature is defined, feature engine 330 can update central registry 335 to reflect the definition. For example, a status of the app feature can be changed from empty to present. As another example, a location (e.g., code name and, potentially, a line number) of the feature's definition can be recorded in central registry.

Feature engine 330 can detect other feature-related actions. For example, feature engine 330 can detect a command or other action indicating that an app feature is to be removed from central registry 335 (e.g., a revoke command), and feature engine can then remove the app feature (e.g., its name, any associated binding and/or other information) from registry 335. As another example, feature engine 330 can detect a command or input requesting information about registered app features in central registry 335. The request can include a request for, e.g.: a list of registered app features, confirmation as to whether a particular app feature is registered, a status of an app feature (empty or present), whether an app feature is bound to another app feature or references a pointer (described in further detail below), etc. Feature engine 330 can search central registry 335 to determine a response to the request and relay the result to developer 105 via app developer 305.

A pointer engine 340 can add dynamic pointers to central registry 335. Code or input can be used to explicitly initialize and/or define a dynamic pointer. For example, a code can initialize a pointer variable, or a developer can interact with a graphical user interface to request a pointer generation.

Pointer engine 340 can detect such code or input and can then add the pointer to central registry 335. Adding the pointer can include adding a name of the pointer and/or adding a value of the pointer to a list, column, row or matrix in central registry 335. The list, column, row or matrix can be within a same structure as one that identifies an app feature or corresponds to a similar list, column, row or matrix that identifies an app feature. Alternatively, they can be independent and non-corresponding (e.g., with regard to listing order). The value of the pointer can identify another app feature or it can be set to empty if no other app feature has yet be identified. In some instances, pointer engine 340 only adds the pointer to central registry 335 after confirming that registry 335 does not already include the pointer (e.g., by searching for the pointer's name).

Pointer engine 340 can also or alternatively detect less explicit pointer-defining code or input. For example, code for an app feature can forego defining or registering a dynamic pointer but nonetheless reference (or call) a dynamic pointer. Such reference can indicate that at least part of the first app feature's value is to depend on a value of another app feature pointed to by the dynamic pointer. This detection can be aided in instances in which dynamic pointers are to have a particular format. Upon detecting the attempted utilization of the dynamic pointer, pointer engine 340 can add the dynamic pointer (e.g., by adding its identified name) to central registry 335.

Thus, a dynamic pointer can be registered to central registry 335 before it is defined. That is, pointer engine 340 detects a new pointer and its name, but the pointer is not set to or pointing to any other object. Pointer engine 340 can then monitor code and/or input for a subsequent definition. Even once a pointer is defined, pointer engine 340 can continue to monitor code and/or input such that it can detect any changes or overrides to the pointer's definition.

Typically, a pointer's definition will include an identification of an app feature. The pointer's definition can further identify a particular field or variable within the app feature. The pointer's definition can be realized based on, e.g., a code (a code for a feature that calls the dynamic pointer or another code) or input received from a developer 105 via a graphical user interface.

Upon detecting the definition, pointer engine 340 can update central registry 335 to reflect the definition. For example, central registry 335 can have an entry for a pointer, and the entry can be updated to include an identifier of an app feature (e.g., its name, entry index, unique identifier, etc.).

The pointer can be defined to point to an app feature that is not registered with central registry 335. In these cases, pointer engine 340 can prompt feature engine 330 to register an appropriate empty app feature to central registry 335.

It will be appreciated that the order of the pointer registration, pointer definition, app feature registration and app feature definition is malleable. That is, in some embodiments, it is acceptable to both define an app feature that calls a dynamic pointer before defining the dynamic pointer and to define the dynamic pointer before defining the app feature that calls the dynamic pointer. Similarly, in some embodiments, it is acceptable to both define a dynamic pointer that points to an app feature before defining the app feature and the converse. Thus, feature engine 330 can regularly or continuously monitor (e.g., monitor code or interface interactions) to detect new or changed references to pointers in app features.

Feature engine 330 can further coordinate binding between elements in central registry 335. Specifically, an app feature can be directly bound to a dynamic pointer and/or indirectly bound to another app feature. Feature engine 330 can directly bind the app feature to the dynamic pointer after detecting that the app feature calls, references or otherwise depends on the dynamic pointer. Feature engine 330 can indirectly bind the app feature to the other app feature upon detecting that the app feature is directly bound to a dynamic pointer and the dynamic pointer is set to a value of the second app feature.

Binding can include links or connections between central registry entries (e.g., feature entries and/or pointer entries) or a portion of the entries that identify a bound object. For example, a binding link can include a vector, with a first element that identifies a referring app feature and a second element that identifies a dynamic pointer. As another example, a portion of an app feature entry can indicate that it is directly bound to a "myquery" dynamic pointer and indirectly bound to a "query1" app feature, or a portion of "query1" can indicate that "feature1" is to be notified of changes involving the query.

Bindings can be direction, such that a binding points in a direction of greater independence. That is, if a first app feature references a dynamic pointer which is set to a second app feature, bindings between the first app feature and the dynamic pointer and second app feature will point away from the first app feature.

Figure 4A:
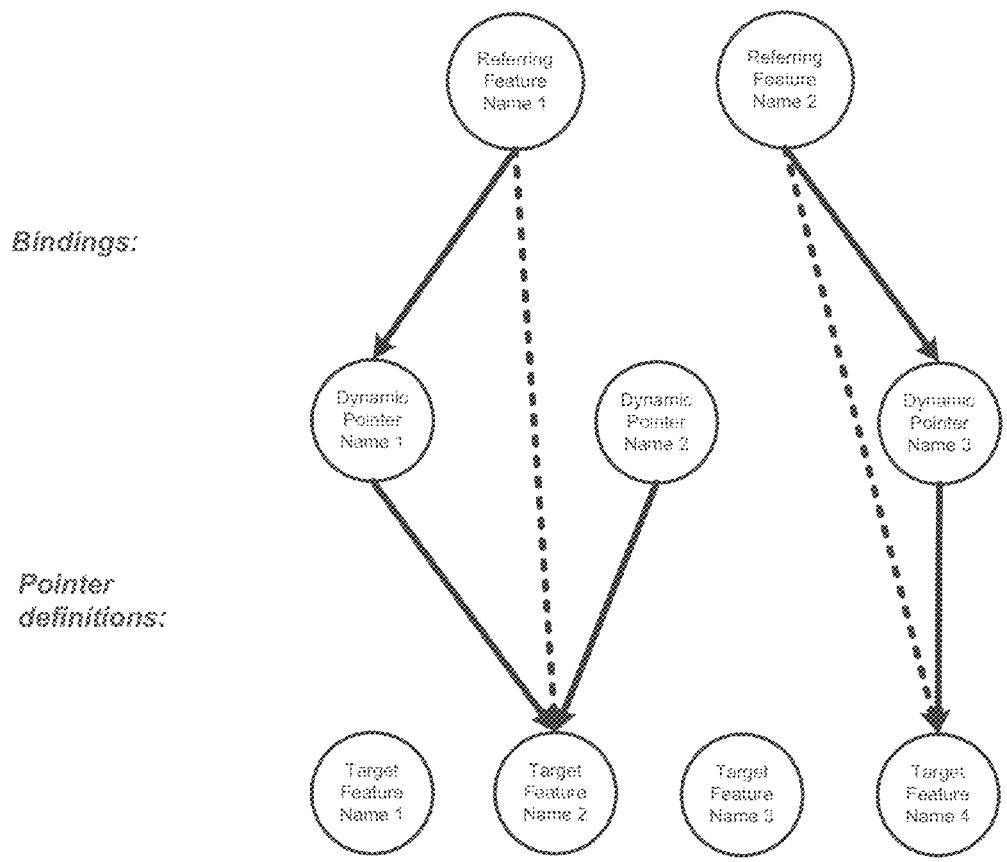
FIGS. 4A and 4B illustrate examples of snapshots of dynamic maps between app features and pointers to reflect current dependencies.
Figure 4B:
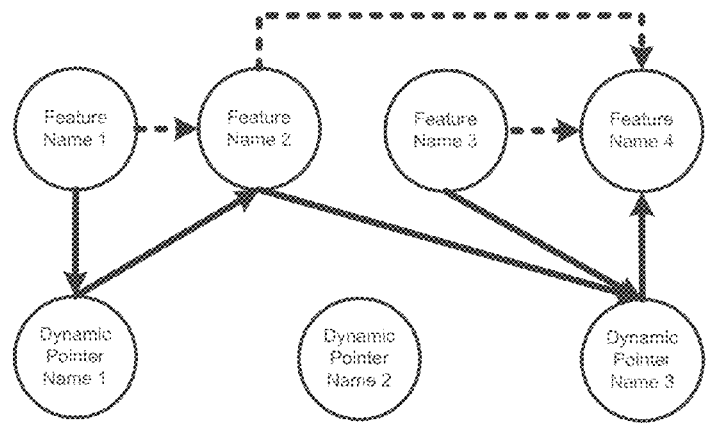

FIGS. 4A and 4B illustrate bindings between registry elements. Each circle represents a registry entry for an app feature or dynamic pointer, and each black line represents a binding. In FIG. 4A, two app features represented in a top row reference or call a dynamic pointer. Thus, they are directly bound to the respective pointers Pointer definitions are represented by the gray lines. Each pointer is set to a particular app feature. Indirect bindings (show as dashed lines) are generated between app features that are connected via pointers.

In FIG. 4A, referring and target features are shown independently. In some instances, there is no such explicit separation from these features. Rather, features can be generally registered with central registry 335 and can serve as a referring feature, a target feature or both. For example, in FIG. 4B, Feature 2 serves as both a referring feature (referencing Pointer 3) and a target feature (with Pointer 1 being set to Feature 2). FIG. 4B further illustrates that a pointer (e.g., Pointer 2) can be included in the registry despite not being defined.

Once a referring feature is bound to a pointer or target feature, an event detector 345 registers the feature to receive notifications of registry events pertaining to the pointer or target feature. This registration allows the referring feature to "listen" to events pertaining to the pointer or target feature. Event detector 345 monitors central registry 335 to detect any registry events. Events can include, e.g., a new pointer registration, a new app feature registration, a new pointer definition, a new app feature definition, a change to a pointer's definition, a change to an app feature's definition, a removal of a pointer, or a removal of an app feature. Event detector 345 can detect the time of the event, an identifier of the involved pointer or app feature, and/or a type of the event (e.g., registration, definition, change, or revocation). Event detector 345 can store the detected information in an event-history database 350.

Event detector 345 can further determine which app features are registered to receive notification of the detected event (e.g., are listening for events involving the event-pertaining feature or pointer). For example, event detector 345 can search a set of binding link vectors or app-feature elements for any that include an identifier of the event-pertaining feature or pointer. Event detector can then notify feature engine 330 of the event and the app features listening for the event. Feature engine 330 can update code for the listening features based on the event. In some instances, the feature code need not be updated but the app feature will automatically be updated in response to the event.

A code executor 355 (which can include a compiler) can (in response to a request from a user or develop or periodically) execute the code. The code can include codes for features, which can reference dynamic pointers. Code executor 355 can access central registry to determine a current value for the pointers. The pointer values can then be seamlessly integrated into the features.

App management system 150 includes two summarizers that can aid a developer 105 in understanding the state(s) and operation(s) of an app. A historical summarizer 360 accesses the event-history database 350 and collects a series of events. Historical summarizer 360 can filter the events and/or restrict the collection based on, e.g., a time period of interest, app-feature types of interest, a developer of interest and/or a type of event of interest. Historical summarizer 360 can sort or otherwise arrange the events, e.g., based on one or more of these same properties. The properties can be defined by a developer (e.g., as a preference or in a recent historical-summary request) or by system 150 (e.g., based on default properties or based on characteristics of developer 150 or registry 335).

Historical summarizer 360 can generate a time line. Each event is assigned a position along an axis corresponding to a time of the event. A symbol (e.g., tick mark, circle, x, dashed line, etc.) can be presented at the position, along with other indications characterizing the event. For example, text or colors can indicate the type of event that occurred, the involved features and/or pointers and/or a developer who initiated the event. Event times may or may not be explicitly or implicitly identified. For example, each event can be accompanied by text noting the event time, or extremes of a timeline can include time identifiers with event times being indicated by their position along the timeline.

Figure 5:
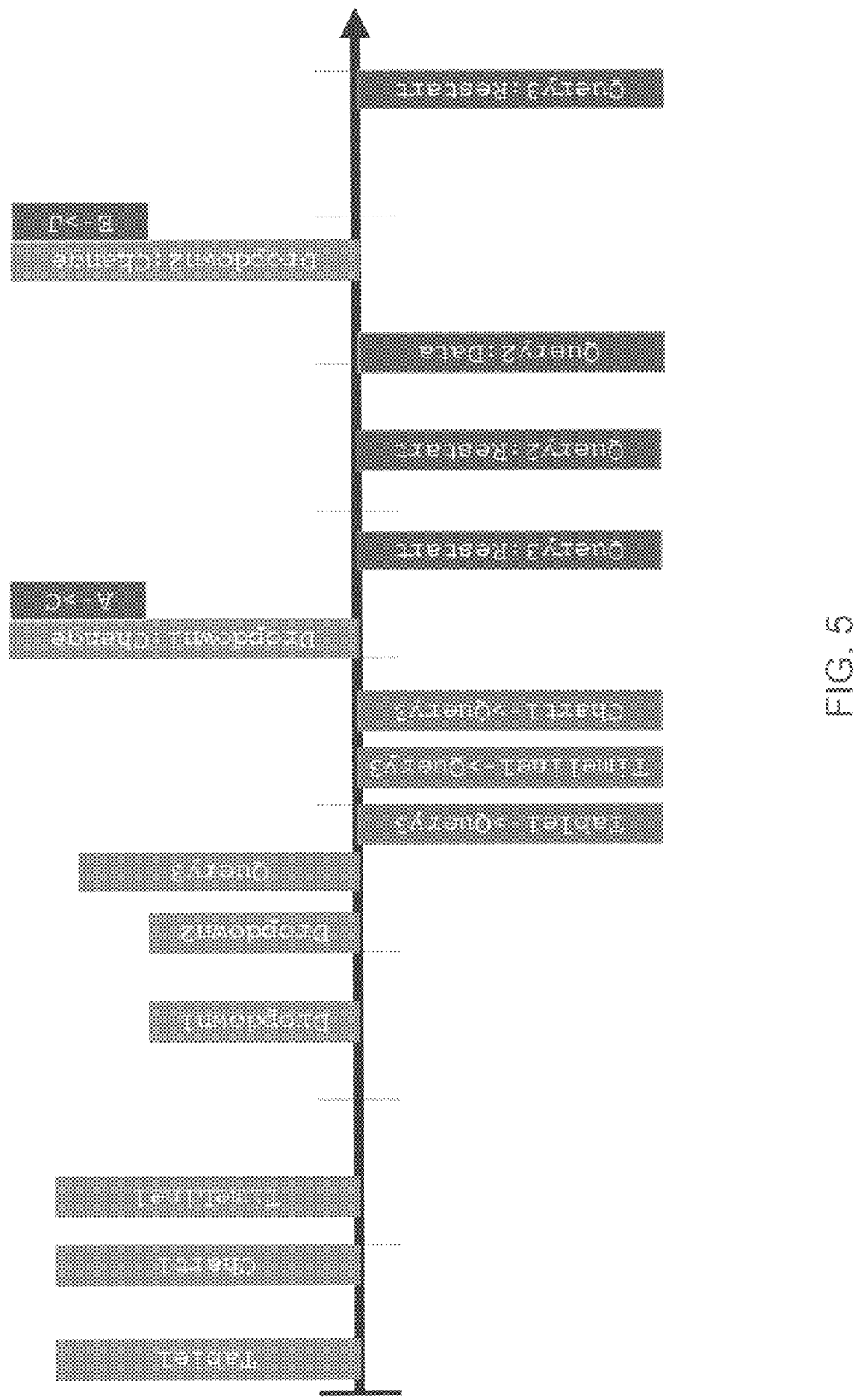
FIG. 5 illustrates an example representation identifying a history of events pertaining to a map of interrelated features and dynamic pointers.

FIG. 5 illustrates an example representation identifying a history of events pertaining to app features and dynamic pointers. Each vertical block represents an event. Its horizontal location along the timeline represents a time of the event. Text in the block characterizes the event. Blocks with a single app feature name indicate that the app feature was created. The blocks with arrows indicate that an indirect binding was generated between the app feature listed before the arrow to the app feature listed after the arrow. The blocks with colons indicate that a value for the app feature listed before the colon was set to that identified after the colon. This particular illustration does not directly represent the involvement of pointers but instead focuses on the resulting indirect binding facilitated by the pointers. However, such events could be included in the timeline in other embodiments.

Historical summarizer 360 can present the historical summary to a developer 105 via an interface or send the summary to developer 105 via email. Developer 105 can interact with the summary and adjust filtering in substantially real-time (e.g., causing the presented summary to be quickly and smoothly readjusted). For example, developer 105 can zoom into or out of a time period.

Developer 105 can interact with the summary to delete event representations. Such an action can serve to merely reduce the presented data or can take effect to actually reverse the particular event (e.g., a pointer definition change, app feature registration, etc.).

A map summarizer 365 can construct a map that identifies interrelationships between app features and/or pointers. Map summarizer 365 can identify a set of unique features in central registry 335. The unique features can be unique features amongst all features in registry 335 or amongst some of the features in registry 335 (e.g., those pertaining to a particular app or developer). Map summarizer 365 can then search bindings to determine which features are bound (e.g., indirectly bound) together and the directionality of the binding. For each feature, map summarizer 365 can also record its type and/or its value.

Map summarizer 365 can further similarly identify a set of unique dynamic pointers or those dynamic pointers facilitating indirect binders. Any involvement of these dynamic pointers in indirect binding can be determined based on direct bindings between a referring app feature and a pointer and the pointer definition.

Map summarizer 365 can then generate a high-level map that identifies the interconnectivity between app features (and potentially between app features and dynamic pointers). The map is high-level in that it does not concentrate on a single binding but instead indicates a set or all of the bindings involving an app feature. Thus, e.g., if a particular app feature referenced three pointers that were defined based on values from the other app features, the map would identify all three resulting indirect bindings.

Map summarizer 365 can then generate and present a map (e.g., including text, a chart or a graphic) that indicates the feature (and potentially pointer) relationships. Information can accompany the map to, e.g., identify, for one, more or each feature, its type and/or value. In some instances, bindings are represented using lines or arrows (with the arrow's direction representing a dependency direction).

Figure 6:
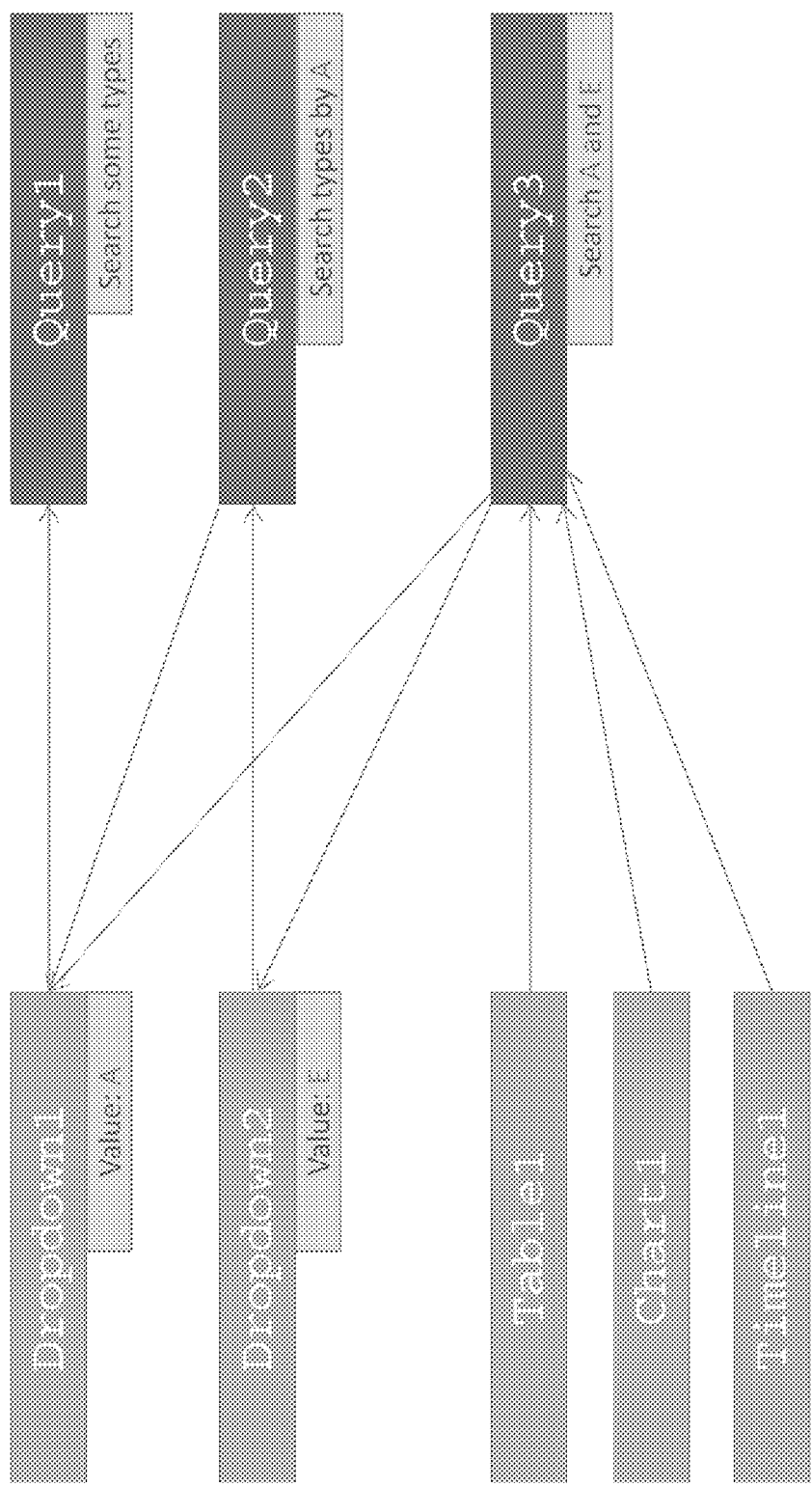
FIG. 6 illustrates an example representation identifying interrelationships between app features.

FIG. 6 illustrates an example presentation of a map identifying interrelationships between features. Once again, the tail of each arrow is at an app feature that depends on the feature at the head of the feature. Thus, for example, Query2 is set to search for data of type "A" since the value of Dropdown1 is "A". Similarly, Query3 is set to search for data of types "A" and "E" due to the values of Dropdown1 and DropDown2. Dropdown1 and Dropdown2 have options that are selected based on the results to Query1 and Query2, respectively. Table1, Chart1 and Timeline1 can include elements that reflect the result of Query3. This presentation can allow a developer 105 to determine an impact of a particular app feature (e.g., whether it is being used at all) and identify all app features with a dynamic element due to the indirect binding.

Map summarizer 365 can receive input from a developer that influences its map generation and/or presentation. For example, a developer 105 can identify a time point (e.g., by entering a date or by sliding a marker along a time bar). Based on the current bindings and definitions recorded in central registry 335 and based on the event history in database 350, map summarizer can derive a map with bindings existing at the time point. In another instance, past registry data can itself be stored. As another example, a developer 105 can identify one or more particular app features of interest (e.g., one(s) not appearing as intended), and map summarizer 365 can generate a restricted map including all bindings involving the particular app feature(s). A default setting or input from developer 105 can identify a level of relationship to present. For example, the developer may wish to view all features separated from a feature of interest by no more than one, two or n dynamic pointers.

The presented map can be static or interactive. In the latter instance, a developer 105 may be able to move binding representations and/or add or delete feature or pointer representations. Map summarizer 365 may then appropriately adjust central registry 335 in accordance with the actions.

Figure 7:
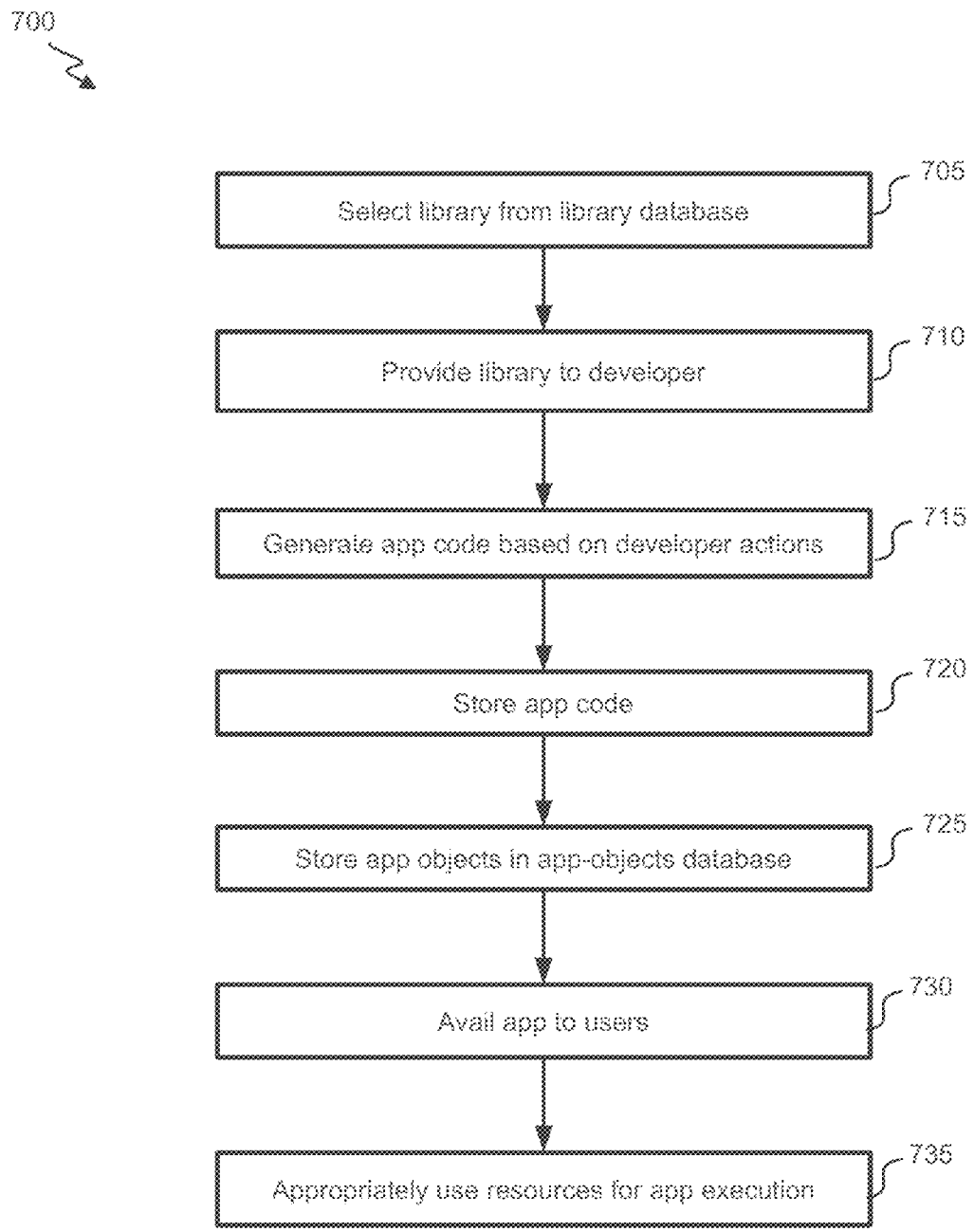
FIG. 7 illustrates a flowchart of an embodiment of a process for facilitating app development.

FIG. 7 illustrates a flowchart of an embodiment of a process 700 for facilitating app development. Process 700 begins at block 705, where library provider 310 selects a library from library database 315. The library can be selected based on characteristics of a developer using app management system 105, input from the developer identifying a type of app that he wishes to develop, and/or default library selections. The library can include subroutines that enable the developer to utilize dynamic pointers and app features calling dynamic pointers. Library provider 310 provides the library to developer 105 at block 710. The provision can include an action that enables developer 105 to utilize the functionality and/or subroutines of the library.

App developer 305 generates code thereby developing an app based on developer actions at block 715. This development may include merely receiving code entered by developer 105. App developer 305 may or may not further modify the received code. The development may include converting developer interactions with a graphical user interface to code. The code can include reference to a dynamic pointer, definition of an app feature and/or definition of a dynamic pointer. App developer 305 stores the code in code database 325 at block 720. The code can be associated with developer 105 and/or an app name in database 325.

App developer 305 stores one or more app objects in app-objects database 320 at block 725. These app objects can include ones uploaded by developer 105 or defined by developer 105 during interactions with a coding module or graphical user interface of app management system 150. The app objects can include ones referenced by the stored app code.

Code executor 355 avails app to users 115 at block 730. For example, code executor 355 can provide a link (with hyperlinked text or icon) that will initiate app execution. As another example, code executor 355 can add an identifier of the app to a database or store, such that users have the ability to purchase and/or download it.

Code executor 355 appropriately utilizes resources and executes the app at block 735. The app may be executed in a cloud and/or on a user device 120. Definitions of dynamic pointers, references to dynamic pointers and/or bindings between app features and dynamic points and/or other app features may be substantially or entirely fixed once a user begins to use the app. Alternatively, cloud-based communications can continue to modify such aspects after receiving developer instruction to do so.

Figure 8:
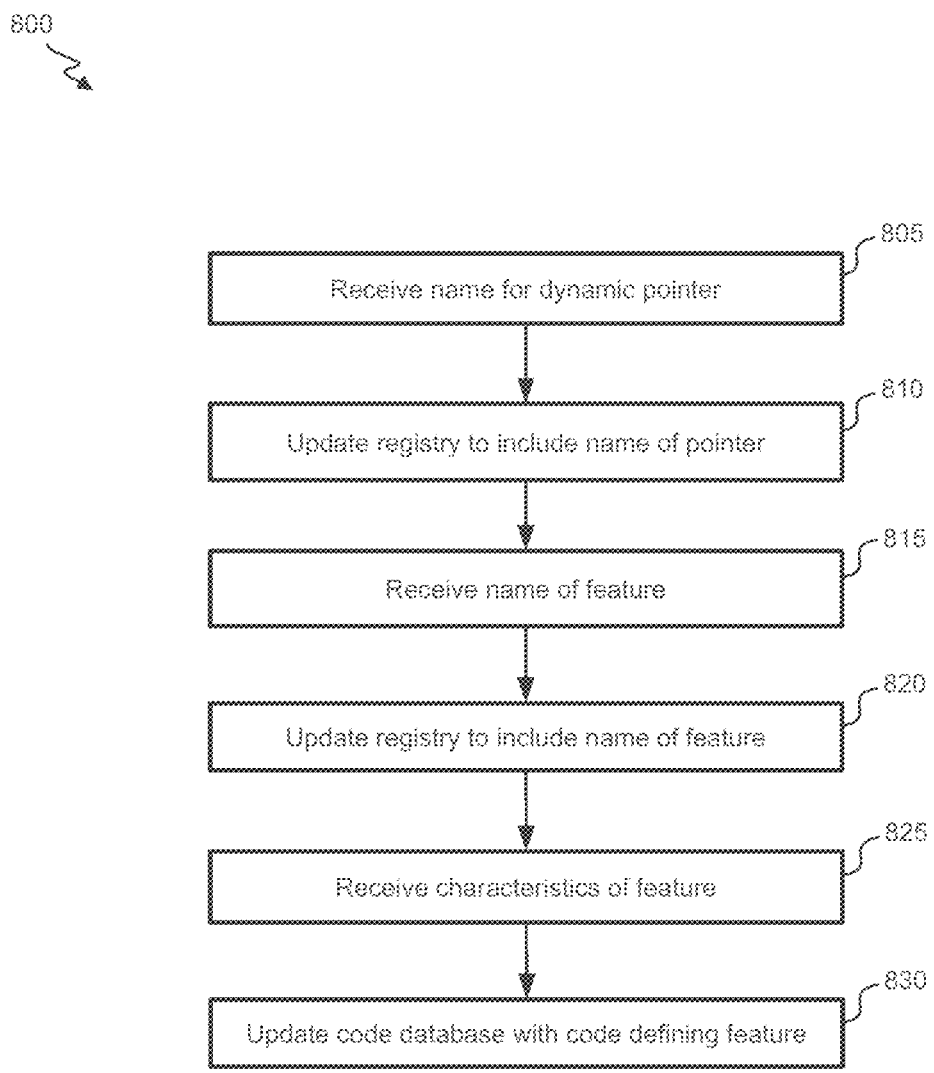
FIG. 8 illustrates a flowchart of an embodiment of a process for tracking feature and pointer dependencies in a central registry.

FIG. 8 illustrates a flowchart of an embodiment of a process 800 for tracking feature and pointer dependencies in a central registry. Process 800 begins at block 805, where pointer engine 340 receives, via app developer 305, a name for dynamic pointer from developer 105. The name can be received as part of an explicit attempt to define or register the dynamic pointer or based on a first reference to the pointer in a code (e.g., a code defining an app feature). Pointer engine 340 updates central registry 335 to include the name of the dynamic pointer at block 810. Pointer engine 340 may first confirm that the name of the dynamic pointer was not previously added to registry 335. If the dynamic pointer has not yet been defined or set to point to an app feature, its value can be empty. Otherwise, its value can be set to include a name of an appropriate app feature.

Feature engine 330 receives a name of a feature at block 815. Developer 105 can identify the name, or it can be automatically assigned upon detecting that a new app feature is being defined. Feature engine 330 updates central registry to include the name of the new app feature at block 820. Feature engine 330 may first confirm that the name of the app feature was not previously added to registry 335.

Feature engine 330 receives characteristics of the app feature at block 825. In some instances, a characteristic indicates that a presentation and/or operation of the app feature is to depend on another app feature (e.g., via a dynamic pointer). The characteristics can be directly identified by developer 105 (e.g., by selecting options or utilizing GUI buttons) or identified as part of a code for the feature. Feature engine 330 can generate or update a code to define the feature such that it includes the characteristics. This code can be separate from or part of an overall code defining an app. Feature engine 330 updates code database 325 to include the code at block 830.

Figure 9:
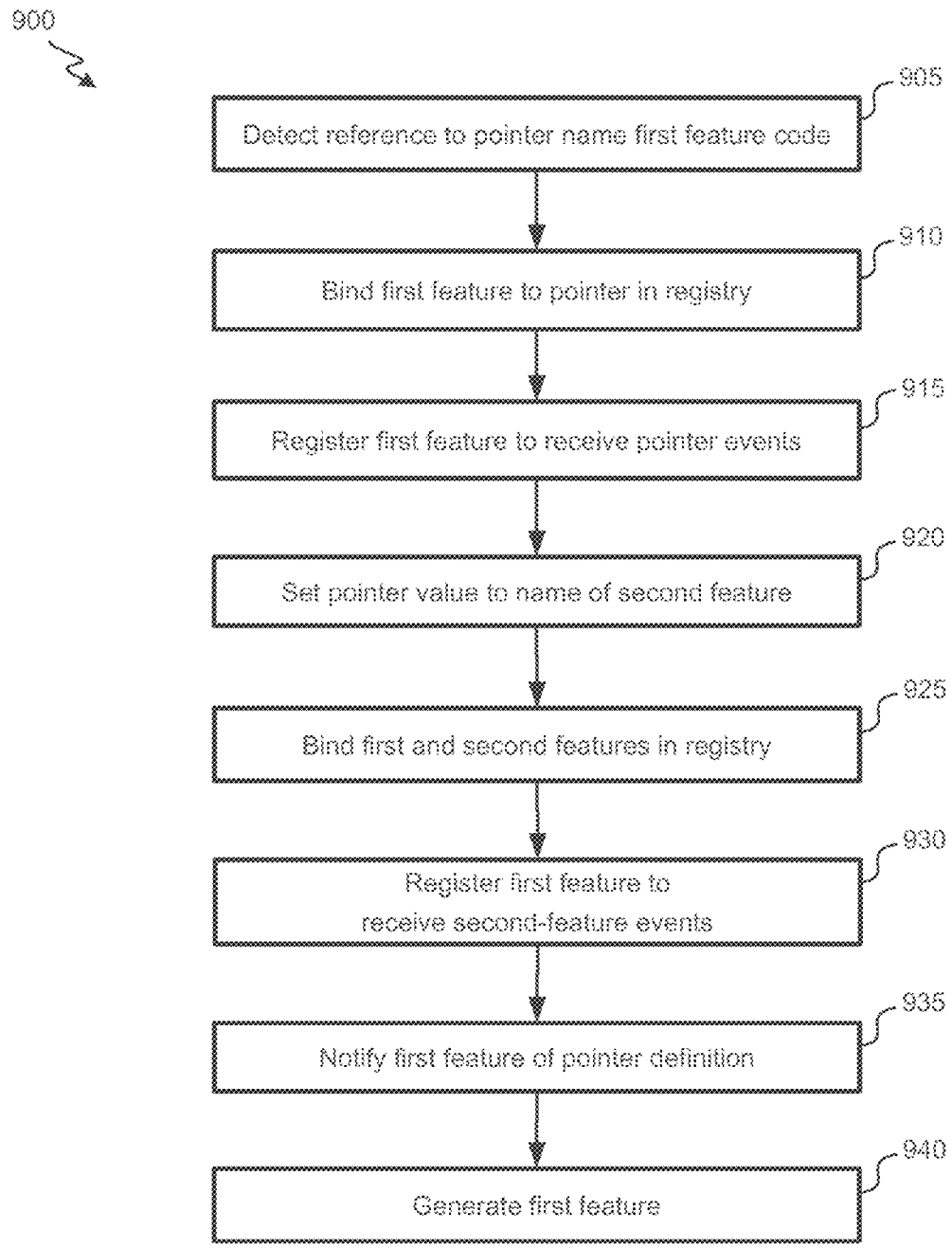
FIG. 9 illustrates a flowchart of an embodiment of a process for dynamically updating a first feature based on a dynamic pointer's definition.

FIG. 9 illustrates a flowchart of an embodiment of a process 900 for dynamically updating a first feature based on a dynamic pointer's definition. Process 900 begins at block 905, where feature engine 330 detects a reference to a pointer name in code of first app feature. The first app feature and the pointer can be ones already registered. If that is not the case, they can both be registered with central registry 335. In response to the detection at block 305, feature engine 330 binds the name of the first feature to the name of the pointer in central registry 335 at block 910. As a consequence of the binding, event detector 345 registers the first feature to receive notifications of events pertaining to the dynamic pointer at block 915.

Pointer engine 340 sets a value for the dynamic pointer to a name of a second feature at block 920. This pointer definition can occur after receiving a code or other input from developer 105 indicating that the second feature is the intended target for the pointer. It is possible that the second feature includes multiple variables, each of which can have a value. Thus, the pointer definition can then be formatted to not only identify the second feature but also to identify the variable of interest.

Feature engine 330 binds the name of the first feature to a name of the second feature (or name of a variable of the second feature) in registry at block 925. This binding is an indirect binding, as it is instituted due to the connection facilitated by the intermediate dynamic pointer. Event detector 345 registers the first feature to receive notifications of events pertaining to the second feature at block 930.

The setting of the pointer value at block 920 is itself an event, that the first feature was registered to be alerted of at block 915. Thus, at block 935, event detector 345 notifies the first feature of the pointer definition. In practice, this notification can include notifying feature engine 330 of the event and identifying the feature which may be affected by the change. In some instances, feature engine 330 will actively alter code of the first feature based on the event. For example, a feature engine 330 may generate a simplified code by replacing the reference to the dynamic pointer (or code defining any previously pointed to feature) with code of the pointed-to second feature. In some instances, no active code alteration is necessary, and the pointer operates to automatically incorporate the appropriate code.

Code executor 355 utilizes the original or modified code of the first feature (and/or the pointer value and/or code of the second feature) to generate the first app feature at block 940. It will be appreciated that the generation can include modifying a previously generated first app feature. The first app feature may then have a value equal to a value of the second feature, or a format or content of the first app feature may be selected based on the value of the second feature (e.g., utilizing an if command or other processing).

Figure 10:
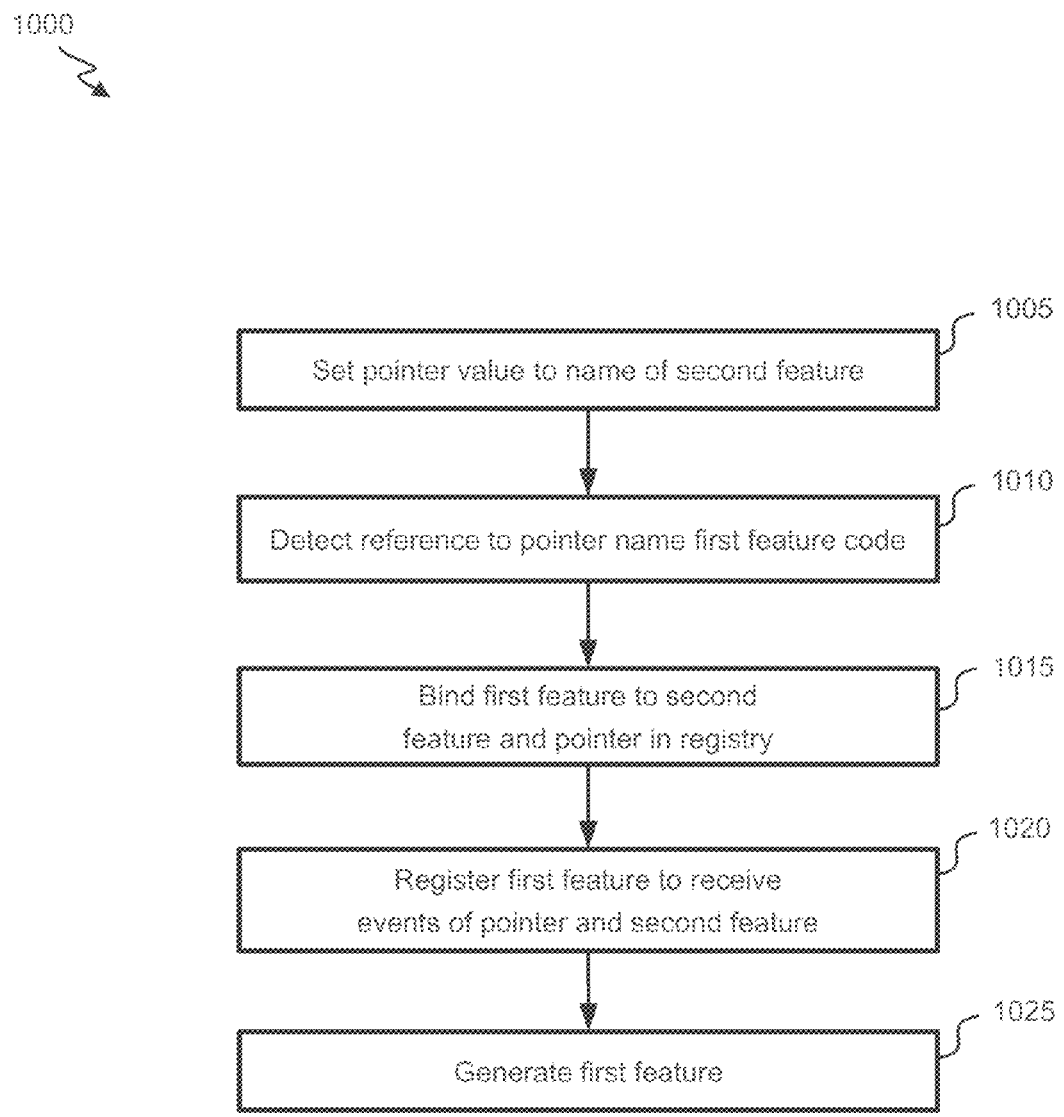
FIG. 10 illustrates a flowchart of an embodiment of a process for dynamically updating a first feature based on a dynamic pointer's definition.

FIG. 10 illustrates a flowchart of an embodiment of a process 1000 for dynamically updating a first feature based on a dynamic pointer's definition. Process 1000 begins at block 1005, where pointer engine 340 sets a value for the dynamic pointer to a name of a second feature. Feature engine 330 detects a reference to the name of the pointer in a code defining the first app feature at block 1010. Feature engine 330 then binds the name of a first feature to a name of the pointer and to a name of the second feature in central registry 335 at block 1015.

Event detector 345 registers the first feature to receive events pertaining to the pointer and/or to the second feature at block 1020. Code executor 355 generates the first app feature at block 1025, such that the operation and/or presentation of the first feature reflect a value of the second feature. In some instances, process 1000 further includes event detector 345 notifying the first feature of the pointer definition (e.g., by notifying feature engine 330). Even though no such event occurred after the first feature was registered to receive such events, the notification can nonetheless be sent such that the first feature can reflect the current pointer setting. As before, in some instances, a feature engine 330 generates a modified first-feature code that replaces a pointer reference with code of the second feature, and in some instances, no such modification is necessary.

In some instances, at least part of the order of the blocks in process 900 and 1000 reflects an actual order. That is, process 900 can illustrate a situation where the first app feature references a pointer prior to it being defined, and process 1000 illustrates a situation where the pointer is defined prior to the first app feature referencing the pointer. The use of central registry 335 dynamic pointers provides the flexibility to use either order, which can ease coding or (app-defining) efforts and reduce error probabilities.

Figure 11:
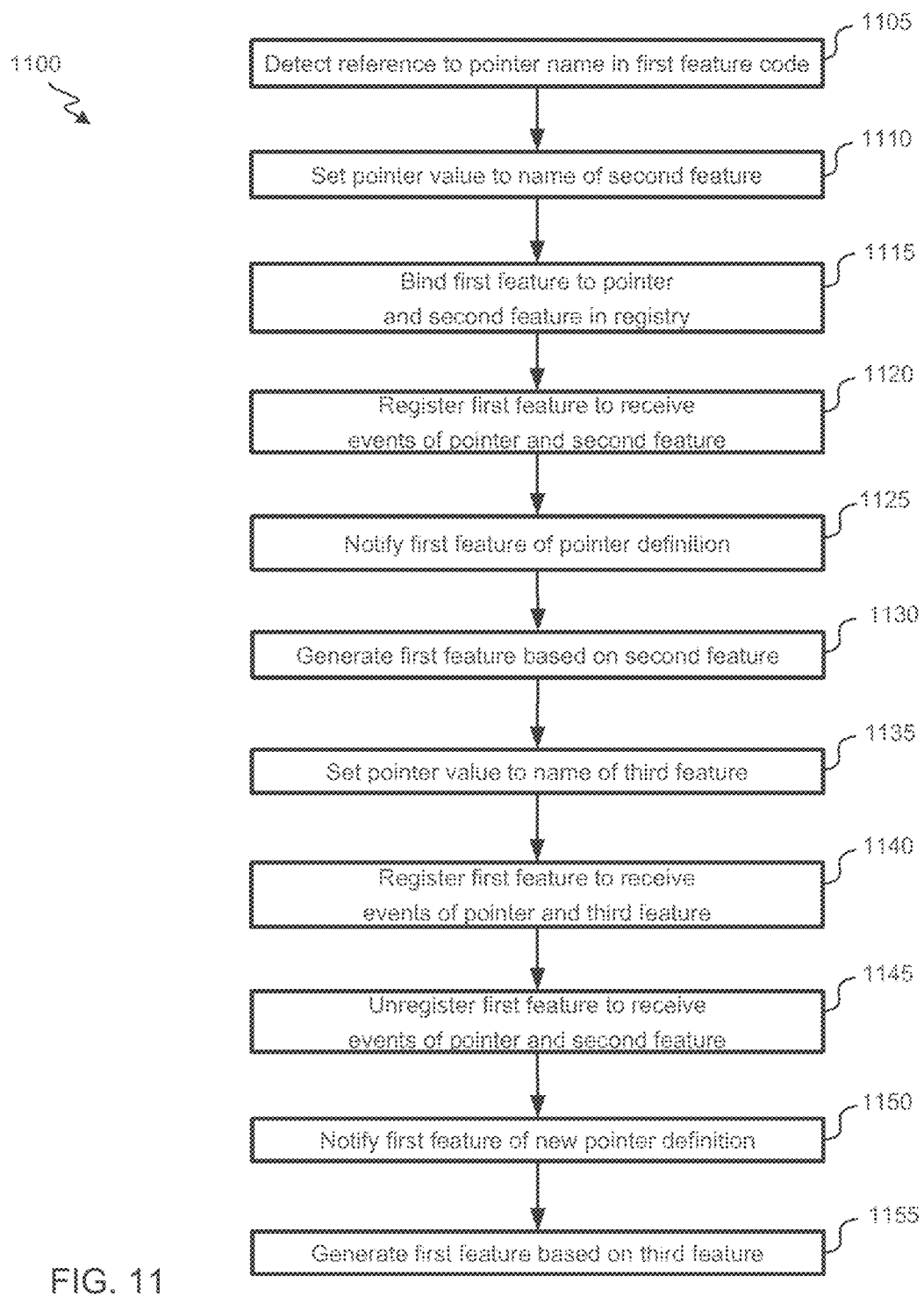
FIG. 11 illustrates a flowchart of an embodiment of a process for dynamically updating a first feature based on a dynamic pointer's definition.

FIG. 11 illustrates a flowchart of an embodiment of a process 1100 for dynamically updating a first feature based on a dynamic pointer's definition. Blocks 1105-1130 of process 1100 can substantially parallel similar blocks in process 900 and/or process 1000.

At block 1135, pointer engine 340 changes the value of the pointer by setting it to a name of a third feature. Consequentially, event detector 345 can adjust registrations appropriately. Specifically, event detector 345 registers the first feature to receive notifications of events pertaining to the third feature at block 1140, and event detector 345 unregisters the first feature to receive notifications of events pertaining to the second feature at block 1145.

The first feature was already registered to receive events pertaining to the pointer (block 1120), and thus, event detector 345 notifies the first feature of the new pointer definition at block 1150. Code executor 355 then generates the first app feature at block 1155, such that the operation and/or presentation of the first feature reflect a value of the third feature.

Figure 12:
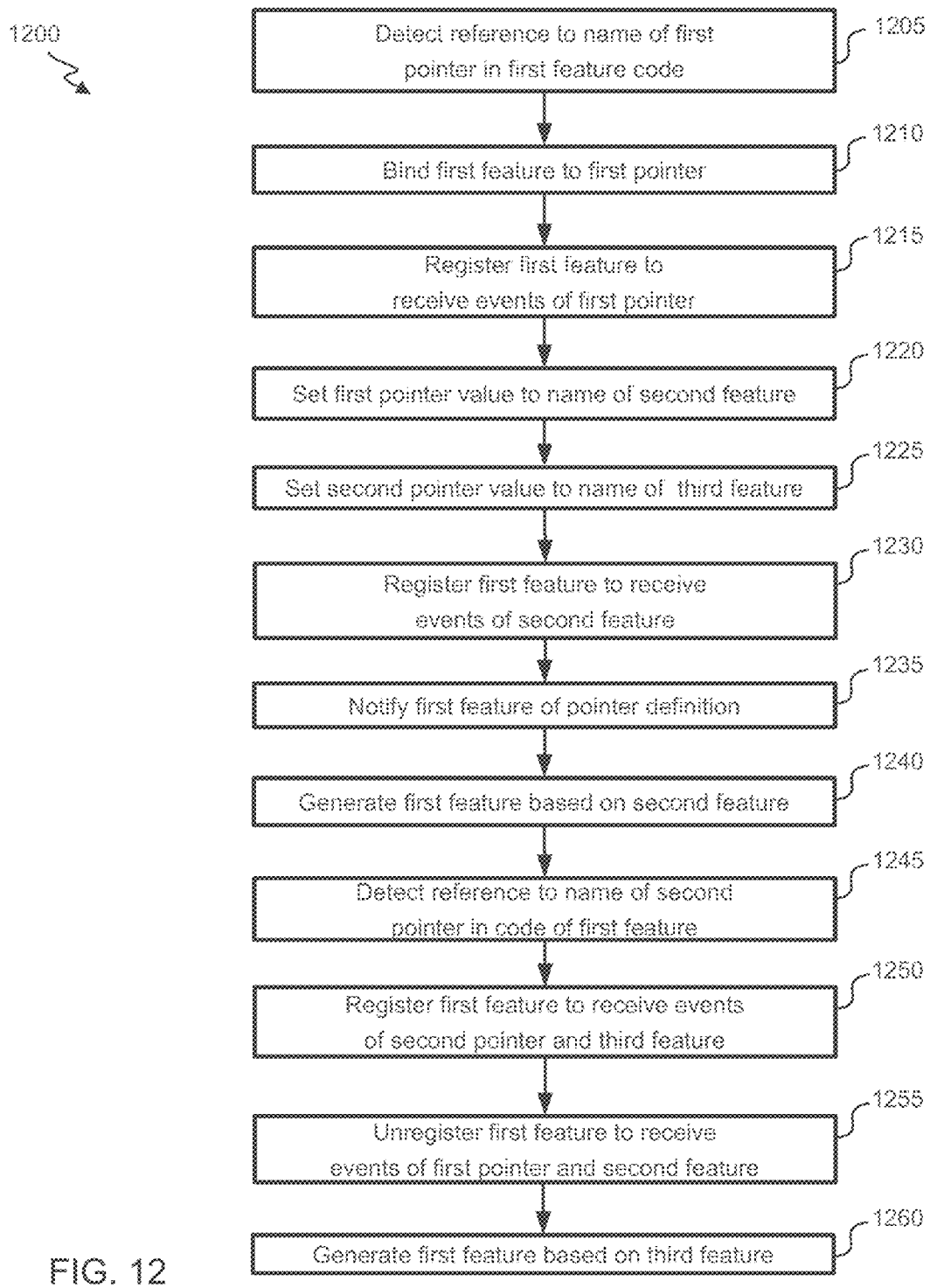
FIG. 12 illustrates a flowchart of an embodiment of a process for dynamically updating a first feature based on a definition of a newly referenced dynamic pointer.

FIG. 12 illustrates a flowchart of an embodiment of a process 1200 for dynamically updating a first feature based on a definition of a newly referenced dynamic pointer. Blocks 1205-1220 and 1230-1240 in process 1200 can substantially parallel similar blocks in process 900 and/or process 1000.

Meanwhile, process 1200 involves two pointers. Pointer engine 340 sets the second dynamic pointer to a name of a third app feature at block 1225. At block 1245, feature engine 330 detects that the reference in the first feature code changes from referencing the first pointer to referencing the second pointer.

Event detector 345 then adjusts registrations appropriately. Specifically, event detector 345 registers the first feature to receive notifications of events pertaining to the second pointer and/or the third feature at block 1250, and event detector 345 unregisters the first feature to receive notifications of events pertaining to the first pointer and/or the second feature at block 1255. Code executor 355 then generates the first app feature at block 1260, such that the operation and/or presentation of the first feature reflect a value of the third feature.

Figure 13:
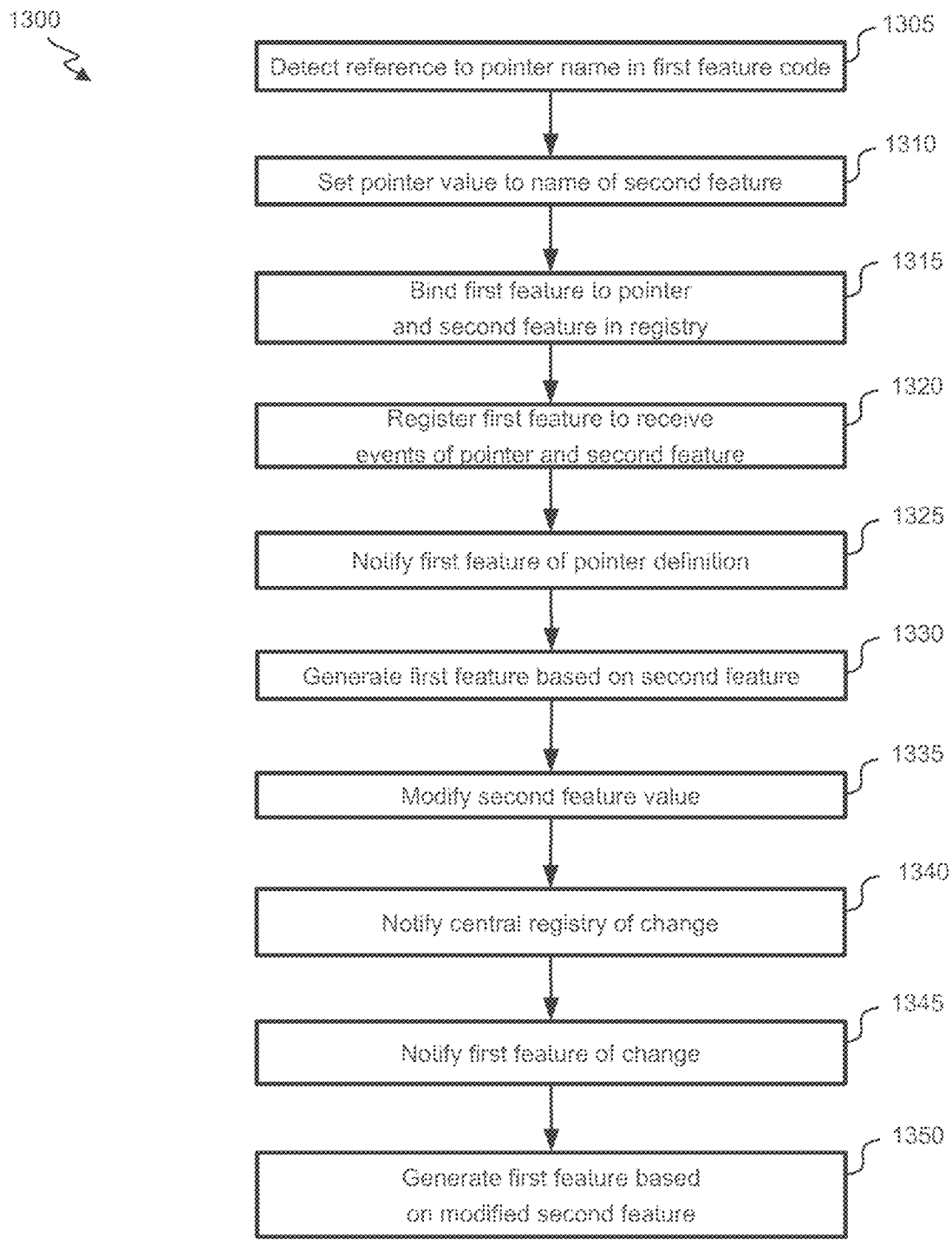
FIG. 13 illustrates a flowchart of an embodiment of a process for dynamically updating a first feature based on a change to a bound second feature.

FIG. 13 illustrates a flowchart of an embodiment of a process 1300 for dynamically updating a first feature based on a change to a bound second feature. Blocks 1305-1330 of process 1300 can substantially parallel similar blocks in process 900 and/or process 1000.

At block 1335, feature engine 330 modifies the second feature. The modification can be based, e.g., on input from developer 105, a database, a current time, user entries, etc. Thus, in some instances, the modification is due to a new result obtained responsive to automatic processing. Feature engine 330 notifies central registry 335 that the change occurred at block 1340. The notification may or may not include additional details as to what type of change occurred and/or what or who initiated the change.

Because the first feature was registered to receive notifications of events pertaining to the second feature, event detector 345 notifies the first feature of the change occurrence at block 1345. This notification also may or may not include additional details as to what type of change occurred. Code executor 355 then generates the first app feature at block 1350, such that the operation and/or presentation of the first feature reflect a value of the modified second feature.

Thus, processes 1100-1300 illustrate how the use of dynamic pointers and central registry 335 can allow a developer 105 to easily adjust the presentation and/or operation of a first feature—not by recoding major portions of the first feature—but by simply shifting a pointer definition, referencing a new feature or allowing system 150 to automatically process updates of other feature updates. This aspect can be particularly advantageous if developer 105 wishes to adjust the presentation and/or operation of many features in a similar manner. System 150 enables developer 105 to accomplish such an objective by adjusting a single variable, thereby also reducing the probability of introducing errors or presentation of unintended content in the app.

Figure 14:
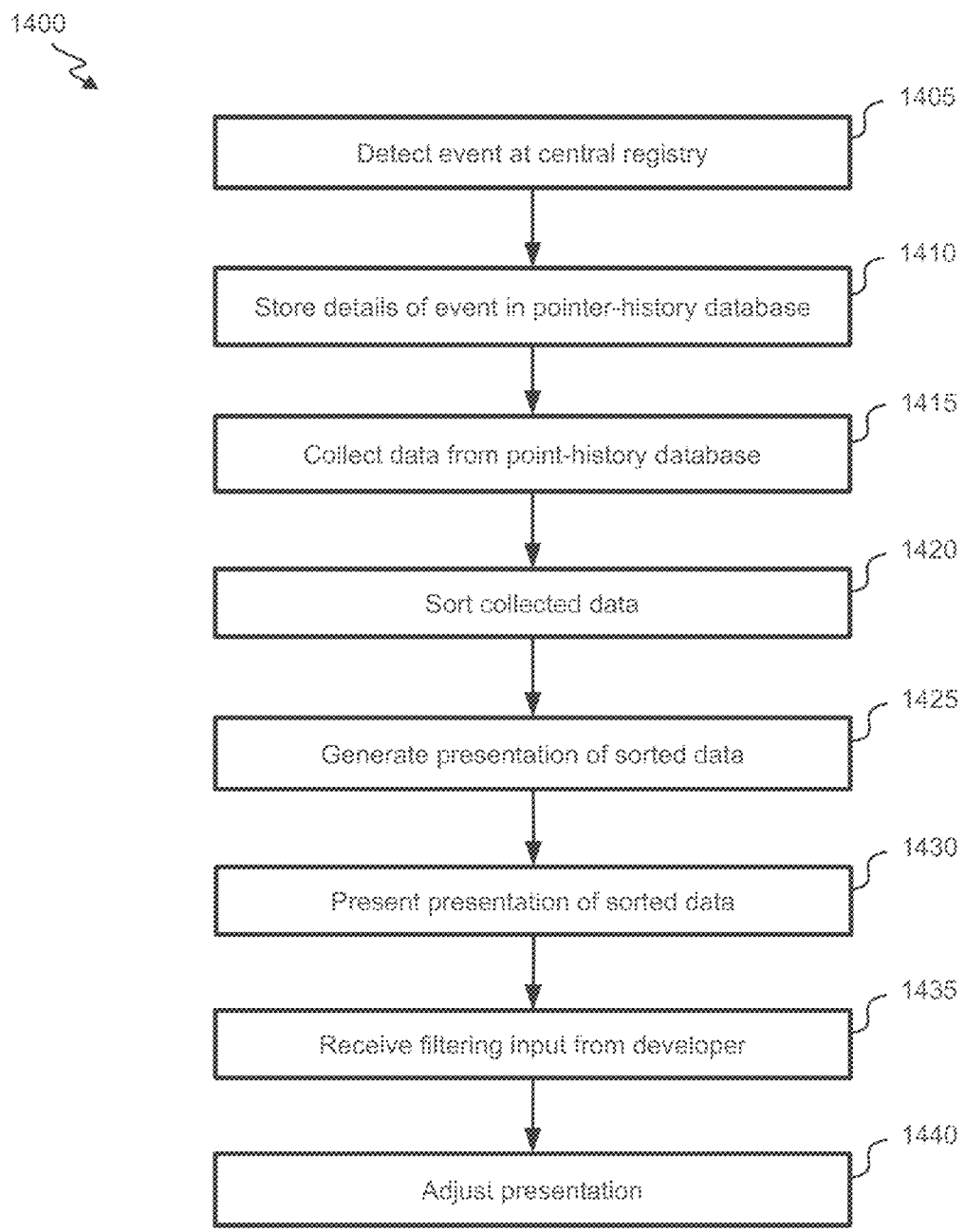
FIG. 14 illustrates a flowchart of an embodiment of a process for tracking and presenting changes in the central registry.

FIG. 14 illustrates a flowchart of an embodiment of a process 1400 for tracking and presenting changes in the central registry. Process 1400 begins at block 1405, where event detector 345 detects events at central registry 335. The events could include, e.g., a registration of a pointer, a registration of an app feature, a new or changed definition of a pointer, alert of new definition of an app feature, a new or changed direct binding from an app feature to a pointer, a new or changed indirect binding from an app feature to another app feature, a removal or a pointer, a removal of an app feature, a removal of a direct binding and/or a removal of an indirect binding.

Event detector 345 stores event details in event-history database 350 at block 1410. The details can include: an identification that an event occurred, an identification as to what type of event occurred (e.g., an identification of one of the above-listed event types), a date and time of the event, an identification of any party or circumstance initiating the event and/or an identification of one, more or all app features influenced by the event (e.g., due to binding).

Historical summarizer 360 collects event data from event-history database 350 at block 1415. The collected data can be all event date with dates and times within a time period, influencing a particular app feature or group of app features, pertaining to a particular app or developer, of one or more types, etc. In some instances, the selection of data is determined based on input from developer 105 (e.g., defining a time period of interest). Historical summarizer 360 sorts the collected data at block 1420. For example, events can be arranged chronologically. Additional sorting (e.g., separating new registrations from changes or removals) can also be performed.

Historical summarizer 360 generates a presentation of the sorted data at block 1425. The presentation can include, e.g., a timeline, such as the one illustrated in FIG. 5. The presentation can identify the events, the involved app features and/or pointers and/or the times of the events. Historical summarizer 360 presents the presentation of sorted data at block 1430. For example, the presentation can be presented on an interface screen to a developer 105.

Historical summarizer 360 receives filtering input from developer at block 1435. The filtering input can, e.g., define one or more time boundaries, an event type of interest, one or more app features of interest, one or more pointers of interest, an identification of whether automatic or developer-initiated events are of interest, etc. Historical summarizer 360 may then recollect and/or resort data based on the filtering. In one instance, block 1435 includes the developer selecting and deleting an event, which may merely delete the event from view or have an effect of reversing the event's occurrence.

Historical summarizer 360 adjusts the presentation at block 1440. The adjusted presentation can conform to the filtering input received at block 1435. The presentation adjustment can be dynamic and in real-time (e.g., zooming in or out of a timeline) or can prompt a new presentation to occur or to be transmitted.

Figure 15:
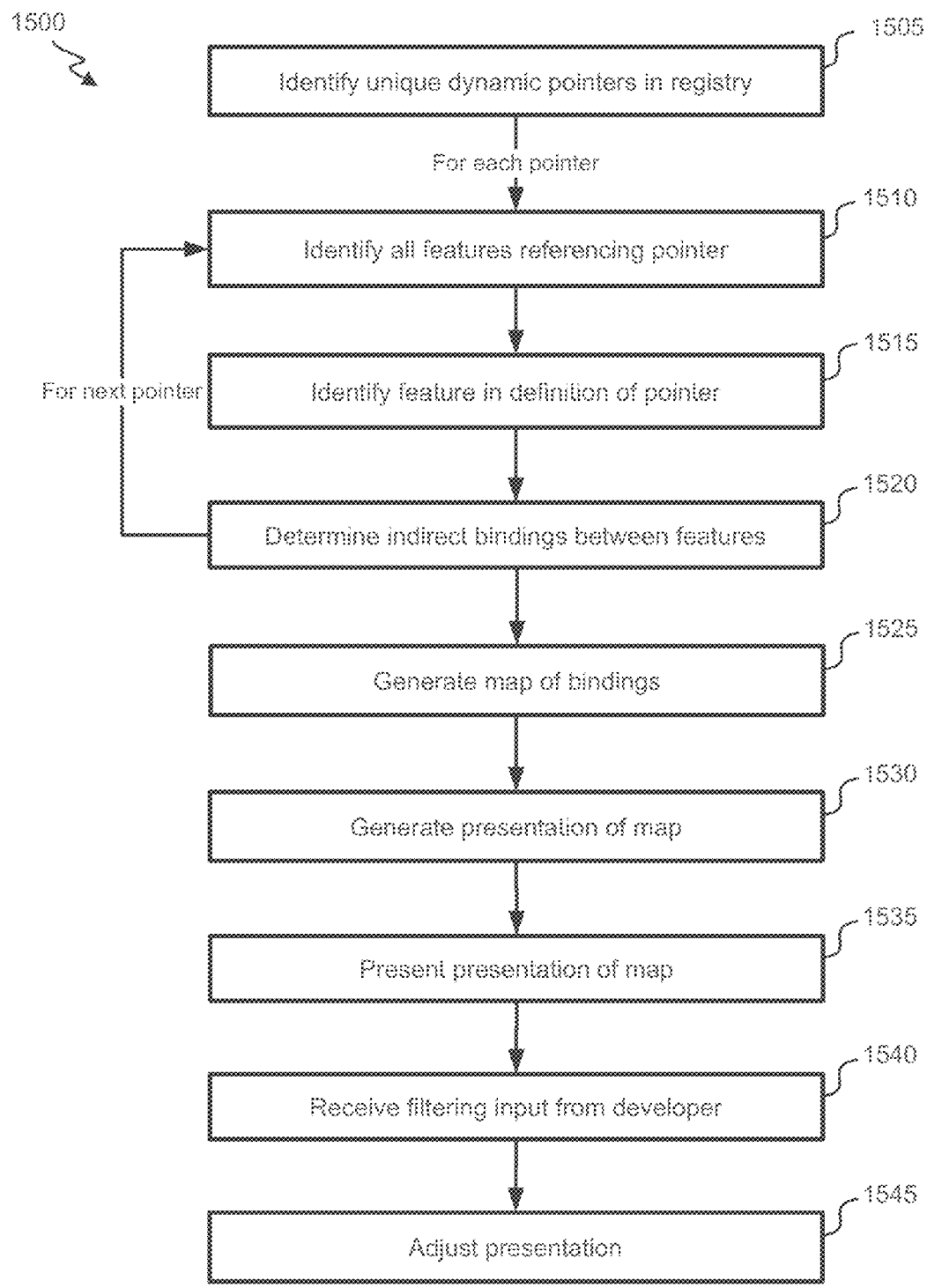
FIG. 15 illustrates a flowchart of an embodiment of a process for identifying interrelationships between features and dynamic pointers.

FIG. 15 illustrates a flowchart of an embodiment of a process 1500 for identifying interrelationships between features and dynamic pointers. Process 1500 begins at block 1505, where map summarizer 365 identifies unique dynamic pointers in central registry 335.

For one of the identified pointers, feature engine 330 identifies all features referencing the dynamic pointer at block 1510. For example, feature engine 330 can identify all app features directly bound to the pointer. Feature engine 330 identifies which app feature (and/or app-feature variable) is present in a definition of dynamic pointer at block 1515. Feature engine 330 determines indirect bindings between features based on references and definition at block 1520. Blocks 1510-1520 are repeated for each pointer. It will be appreciated that, in some instances, block 1505 is omitted from process 1500 and/or feature engine 330 determines indirect bindings in response to central registry 335 being changed in a manner than will influence current indirect bindings.

Map summarizer 365 generates map of bindings at block 1525. The map can include direct bindings, pointer definitions and/or indirect bindings. Thus, in one instance, the map only includes indirect bindings and does not include identifiers of pointers. The map can be constructed to focus, not primarily on individual bindings, but to show how app features and/or pointers are interconnected more globally (e.g., illustrating convergence and divergence of bindings).

Map summarizer 365 filtering generates a presentation of the map at block 1530. The presentation can include identifiers of app features, pointers and one or more types of bindings determined at block 1520. Examples of maps are illustrated in FIGS. 4A, 4B and 6. Map summarizer 365 presents the presentation of the map at block 1535. For example, the presentation can be presented via an interface of an app or website or emailed (e.g., to a developer).

Map summarizer 365 receives filtering input from developer 105 at block 1540. Map summarizer adjusts the presentation in accordance with the filtering input at block 1540. Filtering input may identify one or more types of app features, types of pointers and/or types of bindings of interest. Filtering may identify a time point. Thus, in one instance, a developer 150 can, e.g., slide a marker across a time bar such that the presented map reflects the bindings current at the represented time. In order to adjust the presentation, map summarizer 365 may re-generate the map. In another instance (e.g., where the filtering input defines a time point of interest), map summarizer 365 may identify events that occurred between a previous time point identified and the recent one, such that the map can be adjusted based on the events.

Figure 16:
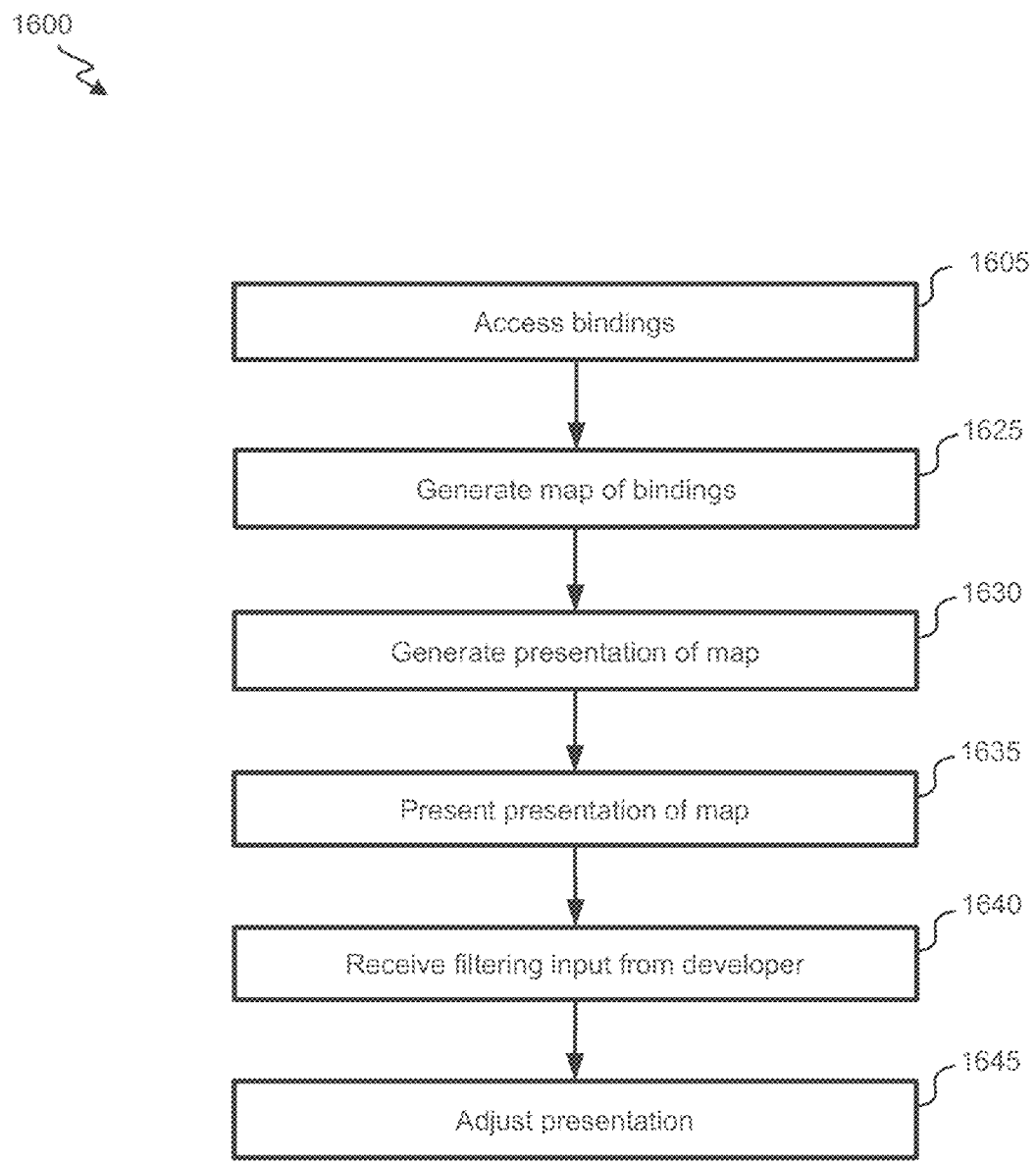
FIG. 16 illustrates a flowchart of an embodiment of a process for identifying interrelationships between features and dynamic pointers.

FIG. 16 illustrates a flowchart of an embodiment of a process 1600 for identifying interrelationships between features and dynamic pointers. Block 1605 comprises accessing bindings. Blocks 1625-1645 can substantially parallel corresponding blocks in process 1500. However, in process 1600, rather than determining indirect bindings between features, map summarizer 365 merely accesses the indirect bindings already determined (e.g., by feature engine 330) and stored in central registry 335.

It will be appreciated that embodiments herein can relate to the processing, storing and/or presentation of structured, semi-structured and/or unstructured data. For example, a developer 105 can build an app that selectively collects portions of the data, which are then analyzed, summarized and/or presented to users 115. Developer 105 can allow user 115 to interact with the data in specified manners (e.g., to adjust a data-summarization level or, correspondingly, a level of detail).

An app feature (e.g., a query) can include or be based on such data. To illustrate, a query can identify a number of stored events within a time period having a particular field value. Other app features can depend on the data-dependent app feature via a dynamic pointer, as described above. In another illustration, a dynamic pointer can be set to point to a portion of the data itself (e.g., a collection of field values).

Data can include, for example:

Log data: types of data access attempts, times of data access attempts, users attempting access, access successes, subsequent user behaviors (e.g., subsequently accessed data or access reattempts), error occurrences, warning occurrences, serving resources Message data (e.g., email data): sender identifiers, recipient identifiers, transmission times, subject lines, message sizes, message formats, message contents Media data: identifiers of movie, picture or sound files; values in files; size of files; entity that uploaded or owns the files; file types; keywords Sensor data (e.g., light sensor, motion sensor, accelerometer): sensor identifiers, sensor locations, sensor values User activity data (e.g., web-access data): web-page identifiers, user identifiers, locations of users, IP addresses of users, devices used by users via access, sequences of page access, access durations, information entered via web pages Social-network data: identifiers of users connected to each other, types of connections, times of connection initiation Inventory data: identifiers of products, product prices, inventory remaining, inventory sold, sale locations, sale prices, profits, manufacturer identifiers Economic data (e.g., stock data, home-sale data): buyer identifiers, purchase times, identifiers of purchased commodity, seller identifiers, location of purchased commodity (if applicable)

Employment data: employer identifiers, employee identifiers, employment locations, position types, hire times, termination times, promotion times, promotion types, connections between employees (e.g., between supervisors and supervised employees), salaries Medical data (e.g., MRI data, EEG data, medical records): patient identifiers, test identifiers, test data, analysis data Genomic data: species identifiers, genes, intra-species reliability, nucleotides, gene identifiers, behavior or disease couplings (e.g., identifying a set of nucleotides being part of gene which is linked to a particular disease)

Search data: search occurrence, search terms, search constraints, users conducting searches, databases searched, results returned, results selected by (e.g., clicked on) by users Call data: phone number and/or user initiating calls, phone number and/or user receiving calls, whether calls were answered, time of call initiations, duration of calls Electrical data (e.g., electricity usage): user identifiers, times of usage, amounts of usage, sources of electricity used (e.g., coal, natural gas, nuclear, solar, wind, etc.)

Neuroscience data (e.g., recordings from neurons): times of recordings, recording values, cell identifiers, amplification settings, users owning recordings As implied from the above examples, data stored and/or used can include a plurality of events (or entries), each of which can include values for particular fields. For example, in the "message data" instance, each event can correspond to a message, and each event can include a value for each of the following fields: sender, recipient, message time, subject, message size, message format, and message content.

Figure 17:
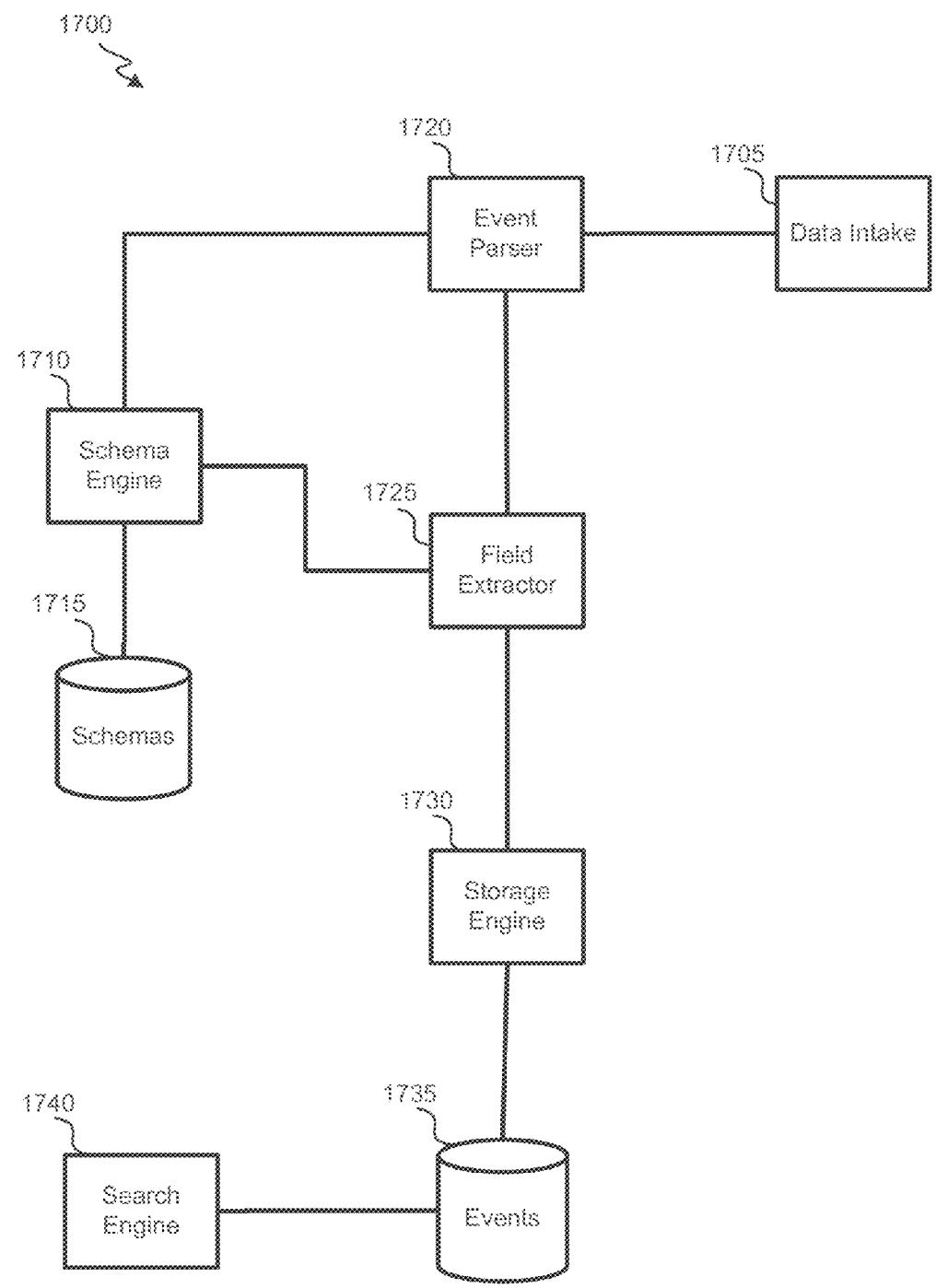
FIG. 17 shows a block diagram of an embodiment of app data management system.

FIG. 17 shows a block diagram of an embodiment of app data management system 1700. Data intake 1705 receives data, e.g., from a data provider, developer, or client. The data can include automatically collected data, data uploaded by users, or data provided by the data provider directly. In some instances, the data includes a structure that allows for individual events and field values within the events to be easily identified. The structure can be predefined and/or identified within the data. For example, various strings or characters can separate and/or identify fields. As another example, field values can be arranged within a multi-dimensional structure, such as a table. In some instances, data partly or completely lacks an explicit structure. For example, a continuous data stream can include multiple events, each with multiple field values.

A schema engine 1710 identifies an applicable schema that can be used to extract specific field values by imposing structure on data. Specifically, a schema can be "bound" to data, by breaking a data stream (e.g., a byte stream) into events and/or extracting field values, such as a time stamp. Schema binding can occur while receiving data, prior to storing data, while storing data, while processing data, while responding to a search query or some combination of the above (e.g., separating data into events at intake and extracting field values from events while responding to a search query). Late binding schema can be used, which imposes structure on the data at query time rather than at storage or ingestion time.

In structured data, an applicable schema is known, such that field values can be reliably extracted. In such instances, schema engine 1710 can receive the schema from a developer, data provider, developer or other client, or schema engine 1710 can identify the schema from the data itself (e.g., with headers or tags identifying various fields, such as <event><message time>2013.01.05.06.59.59</> ... </>). In unstructured data, schema engine 1710 can estimate the schema automatically or on command. For example, schema engine 1710 may identify patterns of characters or breaks within the data stream and estimate field breaks. Received or estimated schemas are stored in a schema database 1715. Schema engine 1710 can perform the schema estimation once or multiple times (e.g., continuously or at routine intervals). In some instances, a developer, client or data provider can provide input indicating a satisfaction with or correction to estimated schema.

Using the schema, an event parser 1720 can separate the received data into events. For example, event parser 1720 can separate data between particular start and stop tags, or separate data within a table's row, or separate data within particular character numbers in the data. Also using the schema, a field extractor 1725 can extract various field values. In some instances, field extractor 1725 further attaches a semantic meaning to the extracted field values (e.g., based on a length and/or character types of the field values). Field extractor 1725 can further convert field values into a particular (e.g., standard or easily searchable) format.

A storage engine 1730 can store data in an event database 1735. It will be appreciated that event database 1735 can include multiple databases or sub-databases. Event database 1735 can be stored in working, short-term and/or long-term memory. In various instances, event database 1735 can include raw data, extracted events or extracted field values. It will be appreciated that, in some instances, part of the data received by data intake 1705 can be deleted or not stored (e.g., field breaks).

Events and/or field values can be stored at locations based on a field value. For example, a field value identifying a message sender may be stored in one of ten databases, the database being chosen based on a message time. In some instances, rather than grouping various data components at specific storage areas, event database 1735 includes an index that tracks identifiers of events and/or fields and of field values. Selective storage grouping can be referred to as storing data in "buckets". Bucket definitions can be fixed or defined based on input from a data provider, developer or client. Input and/or automatic rules can be used to add, merge or delete buckets.

A search engine 1740 can subsequently access and search all or part of event database. The search can be performed upon receiving a search query from a developer, user or client. In some instances, a defined search query is repeatedly performed. Segregation of data into events and/or fields can allow for more efficient searching. The search may include, e.g., a request to return values for one or more first fields for all events having specified values (e.g., specific values or values within a specific range) for one or more second fields. To illustrate, a developed may request that that sender identifiers be returned for all message events having a subject with three or more non-alphanumeric characters. Upon retrieving the event data of interest, search engine 1740 may further process the results (e.g., to obtain an average, frequency, count or other statistic). Search engine 1740 can return the search result to the developer, client or user, e.g., via an interface (such as a web interface or app interface) or email.

Figure 18:
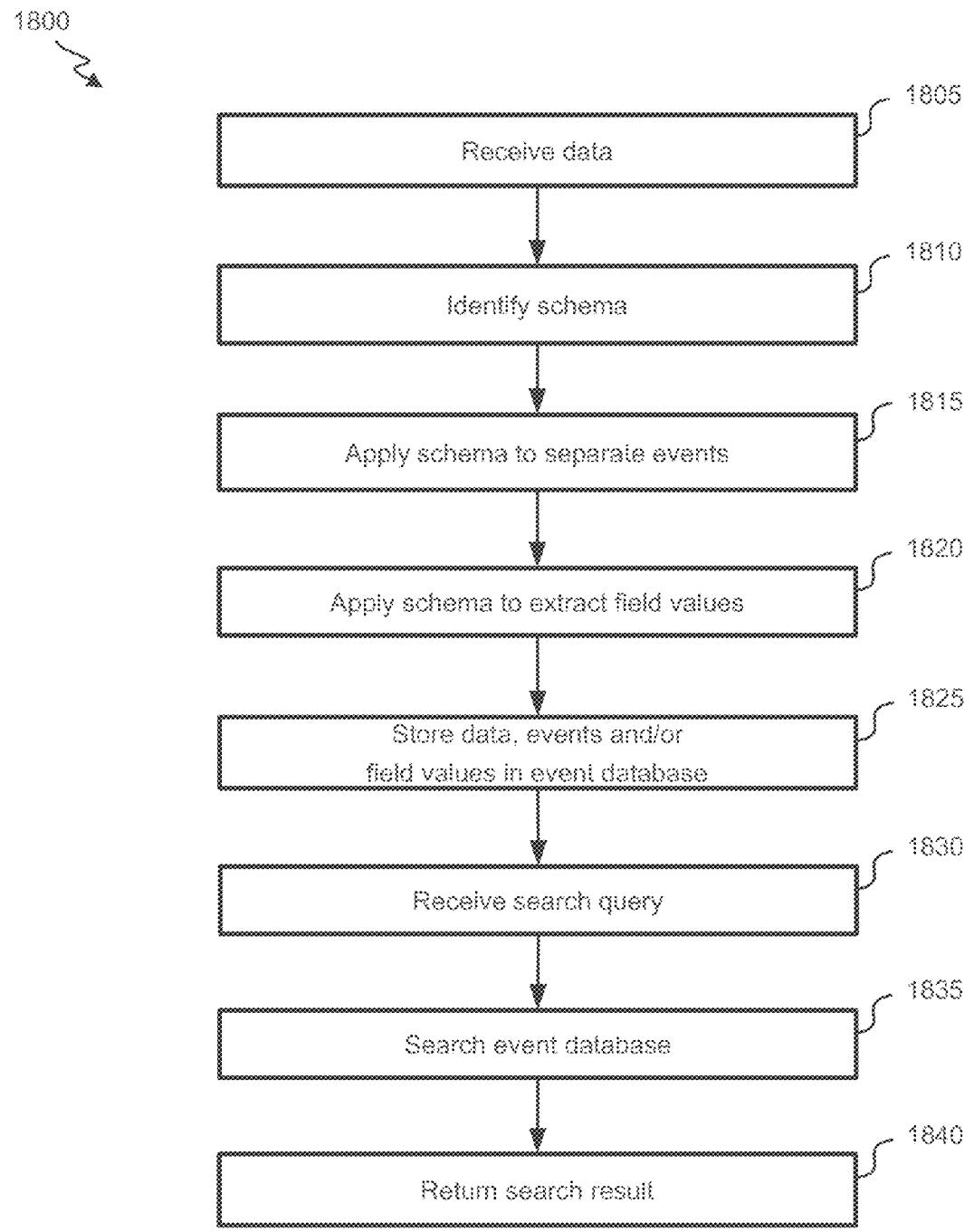
FIG. 18 illustrates a flowchart of an embodiment of a process for storing and using big data.

FIG. 18 illustrates a flowchart of an embodiment of a process 1800 for storing and using big data. Process 1800 begins at block 1805, where data intake 1705 receives data. Schema engine 1710 identifies an applicable schema at block 1810. Event parser 1820 applies the schema to separate the data into events at block 1815. Field extractor 1725 applies the schema to extract field values from the events at block 1820. Storage engine 1730 stores raw data, events and/or field events in event database 1735 (e.g., by assigning the data, events and/or field values to buckets based on particular field values) at block 1825.

Search engine 1740 receives a search query from a searcher (e.g., client, developer or user) at block 1830. The search query can include one or more criteria which can specify or constrain field values. Search engine 1740 searches event database 1735 at block 1835. The search can entail searching only some of event database 1735 (e.g., that including field values of interest). The search can produce identifiers of events of interest. Search engine 1740 may then collect other field values for those of interest. A search result can include the collected other field values and/or a processed version thereof. Search engine 1740 returns the search result to the searcher at block 1840.

It will be appreciated that system 1700 and/or process 1800 can be modified such that schema is not bound to data (or only a portion of the schema is bound to data) immediately following intake. For example, schema could instead be bound prior to or during storage of the data or at a query time (e.g., subsequent to block 1830 of process 1800).

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus.

The computer readable medium can be a machine readable storage device, a machine readable storage substrate, a memory device, a composition of matter effecting a machine readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them, A propagated signal is an artificially generated signal, e.g., a machine generated electrical, optical, or electromagnetic signal, that is generated to encode information for transmission to suitable receiver apparatus.

A computer program (also known as a program, software, software application, script, or code), can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., on or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of nonvolatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, architecture provider or reviewer, embodiments of the subject matter described in this specification can be implemented on a computer having a display device, e.g., a CRT (cathode ray tube) to LCD (liquid crystal display) monitor, for displaying information to the user and a keyboard and a pointing device, e.g., a mouse or a trackball, by which the user can provide input to the computer. Other kinds of devices can be used to provide for interaction with a user, architecture provider or reviewer as well; for example, feedback provided to the user can be any form of sensory feedback, e.g., visual feedback, auditory feedback, or tactile feedback; and input from the user, architecture provider or reviewer can be received in any from, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client server relationship to each other.

While this specification contains many specifics, these should not be construed as limitations on the scope of the invention or of what may be claimed, but rather as descriptions of features specific to particular embodiments of the invention. Certain features that are described in this specification in the context or separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A computer-implemented method, comprising:
    accessing a central registry that includes:
        a set of app feature names corresponding to a set of app features, each app feature of the set of app features being presentable in an app,
        a set of dynamic pointer names corresponding to a set of dynamic pointers, at least one dynamic pointer of the set of dynamic pointers having a value set to one of the app feature names from the set of app feature names, and
        a set of bindings, each particular binding of the set of bindings binding one of the app feature names from the set of app feature names to one of the dynamic pointers of the set of dynamic pointers;
    determining a set of indirect bindings, wherein each particular indirect binding of the set of indirect bindings is between a first app feature name of a first app feature and a second app feature name of a second app feature, the first app feature name being bound to a first dynamic pointer, the first dynamic pointer having a value set to the second app feature name, and each of the first app feature and the second app feature being of the set of app features;
    determining a map identifying interrelationships between particular app features of the set of app features;
    generating a presentation of the map, the presentation including the set of app feature names; and
    presenting the presentation;
    wherein the method is performed by one or more computing devices.

2. The method of claim 1, wherein each particular indirect binding of the set of indirect bindings is directional, indicating which of the corresponding first app feature and the corresponding second app feature is identified in the value of the corresponding first particular dynamic pointer.

3. The method of claim 1, wherein the presentation further includes a value of at least one of the particular app features.

4. The method of claim 1, wherein, for each particular indirect binding, the first app that corresponds to the particular indirect binding is configured to receive notifications about changes to a value for the second app feature that corresponds to the particular indirect binding.

5. The method of claim 1, further comprising receiving input identifying a time instant, wherein the interrelationships are interrelationships that existed at the identified time instant.

6. The method of claim 1, wherein the set of app features for which the interrelationships are identified are limited to app features that are associated with a particular developer.

7. The method of claim 1, wherein the map further identifies pointers bridging particular app feature names, based upon the set of indirect bindings.

8. A system, comprising:
    one or more data processors; and
    a non-transitory computer-readable storage medium containing instructions which when executed on the one or more data processors, cause the one or more processors to perform operations including:
    accessing a central registry that includes:
        a set of app feature names corresponding to a set of app features, each app feature of the set of app features being presentable in an app,
        a set of dynamic pointer names corresponding to a set of dynamic pointers, at least one dynamic pointer of the set of dynamic pointers having a value set to one of the app feature names from the set of app feature names, and
        a set of bindings, each particular binding of the set of bindings binding one of the app feature names from the set of app feature names to one of the dynamic pointers of the set of dynamic pointers;

determining a set of indirect bindings, wherein each particular indirect binding of the set of indirect bindings is between a first app feature name of a first app feature and a second app feature name of a second app feature, the first app feature name being bound to a first dynamic pointer, the first dynamic pointer having a value set to the second app feature name, and each of the first app feature and the second app feature being of the set of app features;

determining a map identifying interrelationships between particular app features of the set of app features;

generating a presentation of the map, the presentation including the set of app feature names; and presenting the presentation.

9. The system of claim 8, wherein each particular indirect binding of the set of indirect bindings is directional, indicating which of the corresponding first app feature and the corresponding second app feature is identified in the value of the corresponding first particular dynamic pointer.

10. The system of claim 8, wherein the presentation further includes a value of at least one of the particular app features.

11. The system of claim 8, wherein, for each particular indirect binding, the first app feature that corresponds to the particular indirect binding is configured to receive notifications about changes to a value for the second app feature that corresponds to the particular indirect binding.

12. The system of claim 8, the operations further comprising receiving input identifying a time instant, wherein the interrelationships are interrelationships that existed at the identified time instant.

13. The system of claim 8, wherein the set of app features for which the interrelationships are identified are limited to app features that are associated with a particular developer.

14. The system of claim 8, wherein the map further identifies pointers bridging particular app feature names, based upon the set of indirect bindings.

15. A computer-program product tangibly embodied in a non-transitory machine-readable storage medium, including instructions configured to cause one or more data processors to:

access a central registry that includes:
a set of app feature names corresponding to a set of app features, each app feature of the set of app features being presentable in an app,
a set of dynamic pointer names corresponding to a set of dynamic pointers, at least one dynamic pointer of the set of dynamic pointers having a value set to one of the app feature names from the set of app feature names, and
a set of bindings, each particular binding of the set of bindings binding one of the app feature names from the set of app feature names to one of the dynamic pointers of the set of dynamic pointers;

determine a set of indirect bindings, wherein each particular indirect binding of the set of indirect bindings is between a first app feature name of a first app feature and a second app feature name of a second app feature, the first app feature name being bound to a first dynamic pointer, the first dynamic pointer having a value set to the second app feature name, and each of the first app feature and the second app feature being of the set of app features;

determine a map identifying interrelationships between particular app features of the set of app features;

generate a presentation of the map, the presentation including the set of app feature names; and present the presentation.

16. The computer-program product of claim 15, wherein each particular indirect binding of the set of indirect bindings is directional, indicating which of the corresponding first app feature and the corresponding second app feature is identified in the value of the corresponding first particular dynamic pointer.

17. The computer-program product of claim 15, wherein the presentation further includes a value of at least one of the particular app features.

18. The computer-program product of claim 15, wherein, for each particular indirect binding, the first app feature that corresponds to the particular indirect binding is configured to receive notifications about changes to a value for the second app feature that corresponds to the particular indirect binding.

19. The computer-program product of claim 15, wherein the instructions are further configured to cause the one or more data processors to receive input identifying a time instant, wherein the interrelationships are interrelationships that existed at the identified time instant.

20. The computer-program product of claim 15, wherein the set of app features for which the interrelationships are identified are limited to app features that are associated with a particular developer.

21. The computer-program product of claim 15, wherein the map further identifies pointers bridging particular app feature names, based upon the set of indirect bindings.

\* \* \* \* \*